US008507798B2

(12) United States Patent
Sempliner et al.

(10) Patent No.: US 8,507,798 B2
(45) Date of Patent: Aug. 13, 2013

(54) SEALING GROMMET

(75) Inventors: Arthur T. Sempliner, Douglaston, NY (US); Jonathan Pettingill, Brooklyn, NY (US)

(73) Assignee: Upsite Technologies, Inc., Santa Fe, NM (US)

( * ) Notice: Subject to any disclaimer, the term of this patent is extended or adjusted under 35 U.S.C. 154(b) by 629 days.

(21) Appl. No.: 12/705,280

(22) Filed: Feb. 12, 2010

(65) Prior Publication Data

US 2011/0042123 A1    Feb. 24, 2011

Related U.S. Application Data

(60) Provisional application No. 61/235,897, filed on Aug. 21, 2009.

(51) Int. Cl.
*H02G 3/22* (2006.01)
(52) U.S. Cl.
USPC .............. 174/153 G; 174/152 G; 174/650; 174/152 R; 16/2.1; 16/2.2; 248/56
(58) Field of Classification Search
USPC .............. 174/650, 153 G, 152 R, 151, 135, 174/659; 248/56; 16/2.1, 2.2; 439/604, 439/587, 274, 275; 277/55, 602, 603, 607, 277/608; 52/27, 190, 204.1, 73, 199, 192, 52/273, 220.1, 503, 454, 220.7; 49/365; 160/19; 29/623.2
See application file for complete search history.

(56) References Cited

U.S. PATENT DOCUMENTS

| 3,434,273 | A | 3/1969 | Lovell |
| 4,099,020 | A | 7/1978 | Kohaut |
| 4,344,205 | A | 8/1982 | Latino et al. |
| D268,895 | S | 5/1983 | Beleckis |
| 4,465,288 | A | 8/1984 | Kofoed, Sr. |
| 4,520,976 | A | 6/1985 | Cournoyer et al. |
| 4,678,075 | A | 7/1987 | Bowman, Jr. |
| D298,494 | S | 11/1988 | Mockett |
| 4,905,428 | A | 3/1990 | Sykes |
| 5,101,079 | A | 3/1992 | Rodrigues et al. |
| 5,195,288 | A | 3/1993 | Penczak |

(Continued)

FOREIGN PATENT DOCUMENTS

GB    167605    8/1921

OTHER PUBLICATIONS

International Search Report and Written Opinion of the International Searching Authority; PCT/US2010/039173; Aug. 3, 2010; 16 pages.

*Primary Examiner* — Angel R Estrada
(74) *Attorney, Agent, or Firm* — St. Onge Steward Johnston & Reens LLC

(57) ABSTRACT

A sealing grommet, particularly for data centers and the like, formed of one or a pair of U-shaped frame sections, each co-molded with a thermoplastic elastomeric seal of corrugated wave form, with corrugated edges of the seals exposed at the open sides of the U-shaped frames. A pair of such grommet sections joined together, with the corrugated edges arranged to be in contact and in phase, provides a uniquely efficient seal to hold back air under pressure while allowing various pass-through elements, such as cables, hoses, etc., to be extended through the grommet and while enabling the pass-through elements to be easily added, removed, or rearranged as may be necessary to accommodate the dynamic changes experienced in the operation of a data center.

64 Claims, 19 Drawing Sheets

FIG. 14

(56) References Cited

U.S. PATENT DOCUMENTS

| | | |
|---|---|---|
| 5,392,571 A | 2/1995 | Greenfield |
| 5,440,841 A | 8/1995 | Greenfield |
| 5,594,209 A | 1/1997 | Nattel et al. |
| 5,628,157 A | 5/1997 | Chen |
| 5,630,300 A | 5/1997 | Chen |
| 5,643,384 A | 7/1997 | Okabe |
| 5,659,924 A | 8/1997 | Gildersleeve |
| 5,727,351 A | 3/1998 | Neathery et al. |
| 5,793,566 A | 8/1998 | Scura et al. |
| 5,994,644 A | 11/1999 | Rindoks et al. |
| 6,102,229 A | 8/2000 | Moncourtois |
| 6,194,659 B1 | 2/2001 | Cornu |
| 6,255,597 B1 | 7/2001 | Bowling et al. |
| 6,265,670 B1 | 7/2001 | Duesterhoeft et al. |
| 6,278,061 B1 | 8/2001 | Daoud |
| 6,291,774 B1 | 9/2001 | Williams |
| 6,632,999 B2 | 10/2003 | Sempliner et al. |
| 6,936,770 B2 | 8/2005 | Takedomi et al. |
| 7,381,765 B2 | 6/2008 | Park |
| 8,049,109 B2 * | 11/2011 | Sempliner et al. ........ 174/153 G |
| D653,099 S * | 1/2012 | Sempliner et al. ............. D8/356 |
| D653,936 S * | 2/2012 | Sempliner et al. ............. D8/356 |
| 2009/0151983 A1 | 6/2009 | Sempliner et al. |

* cited by examiner

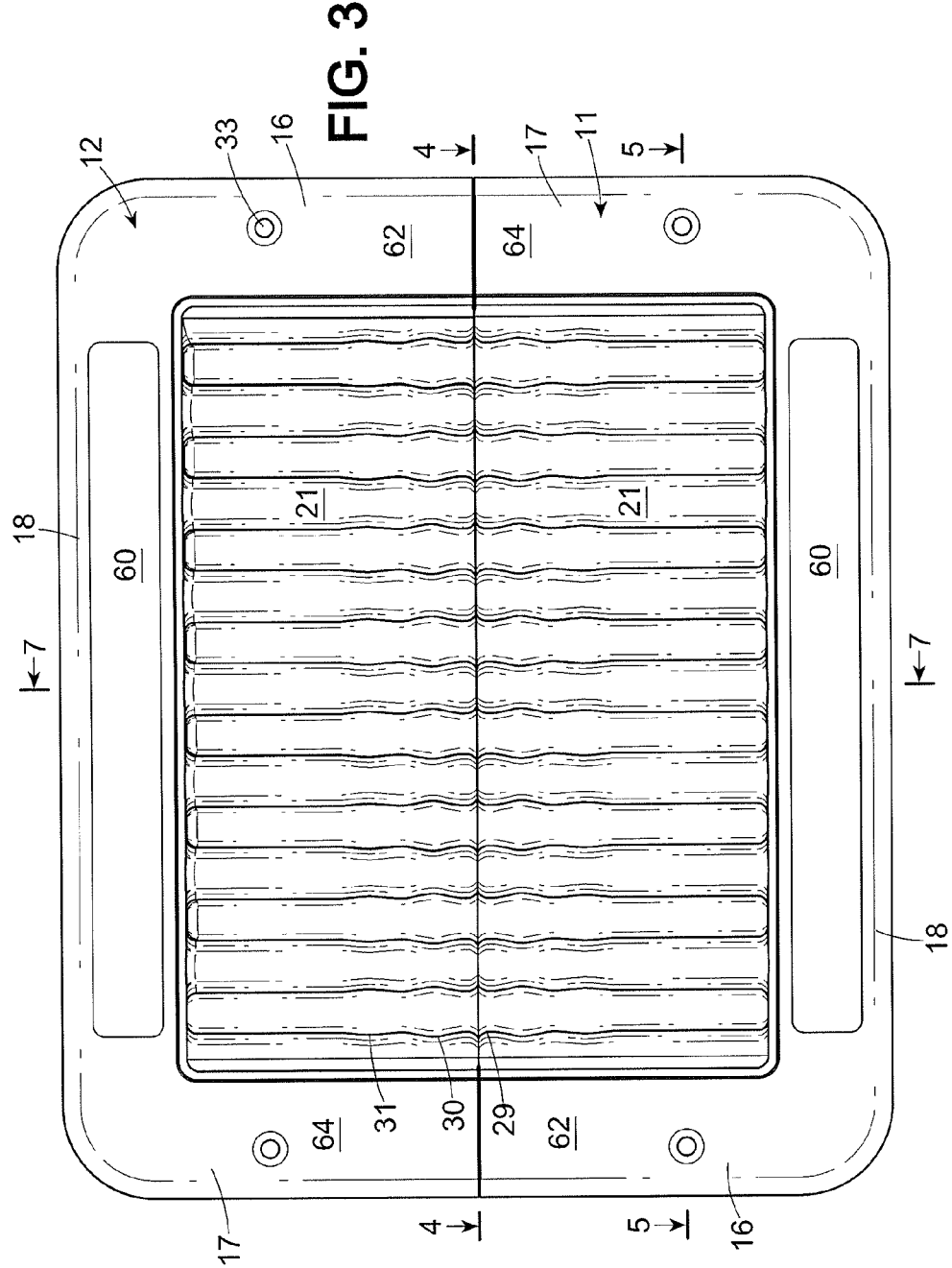

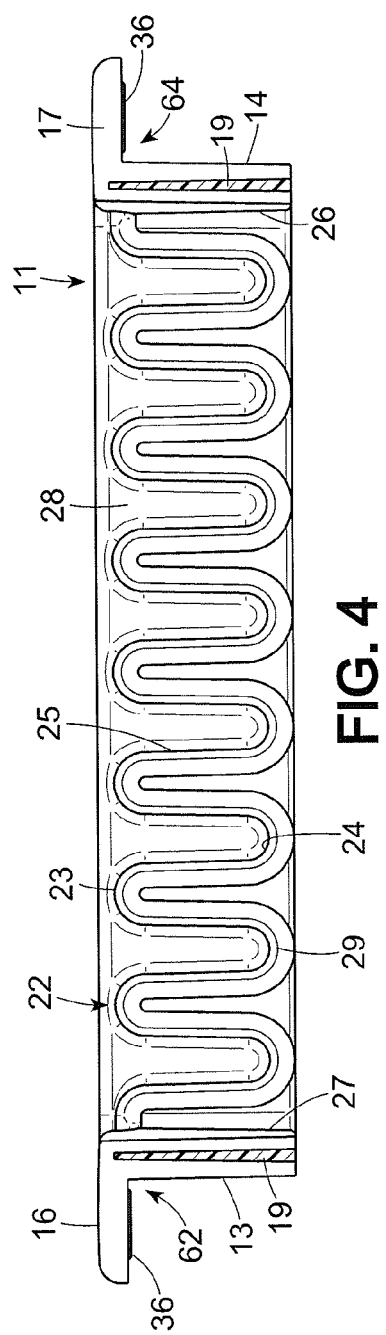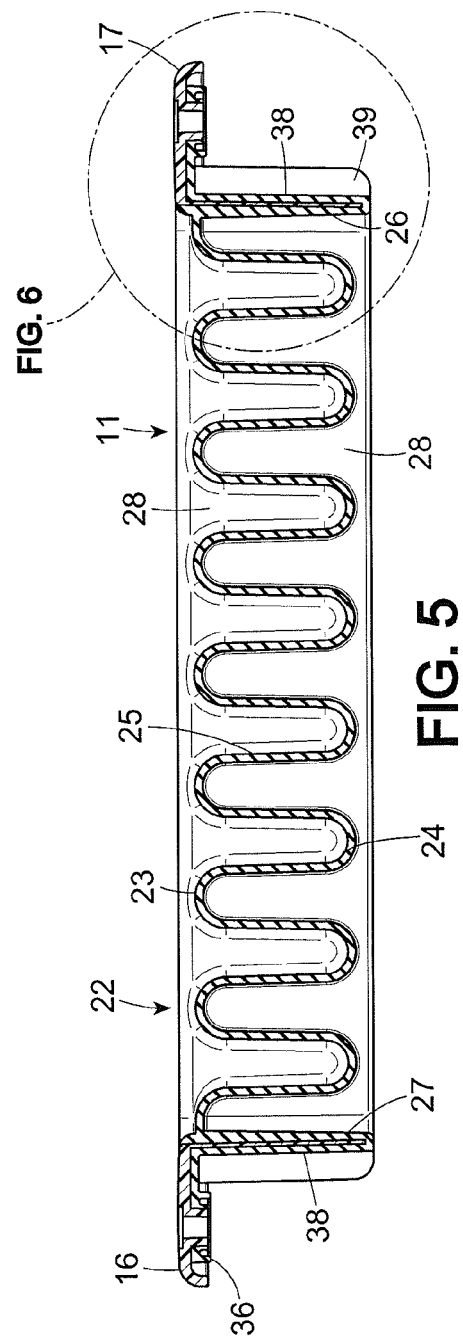

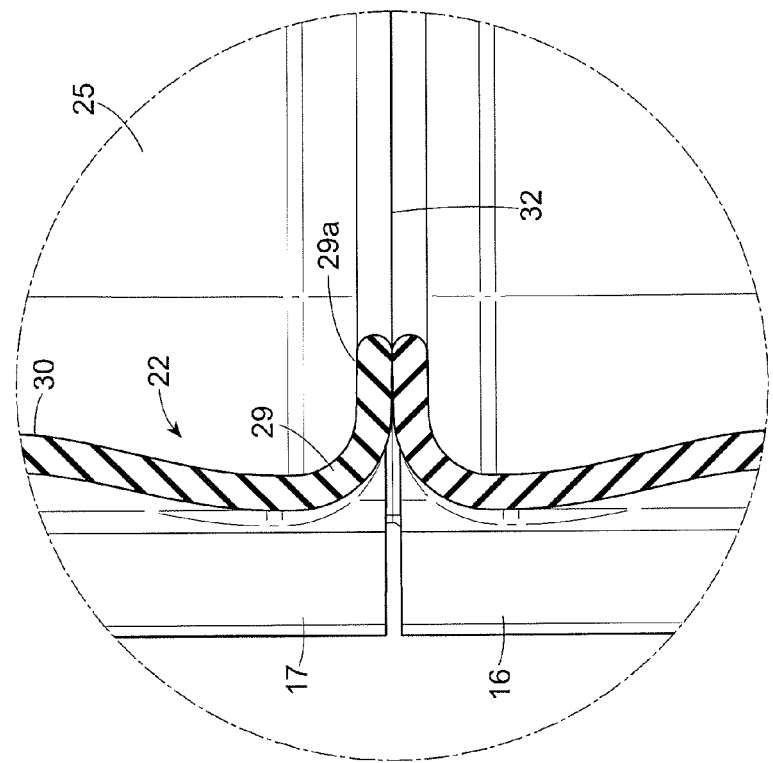
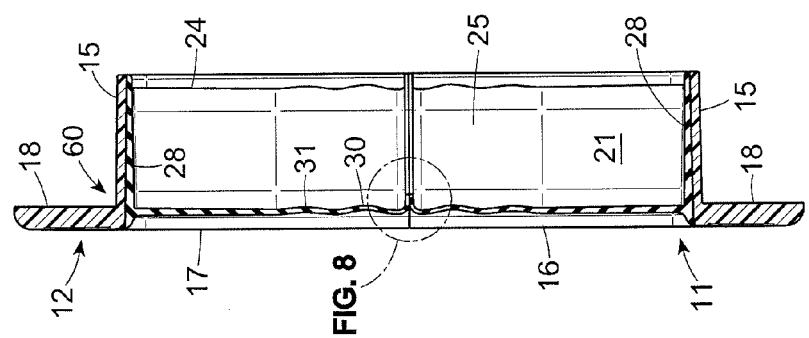
FIG. 8
FIG. 7

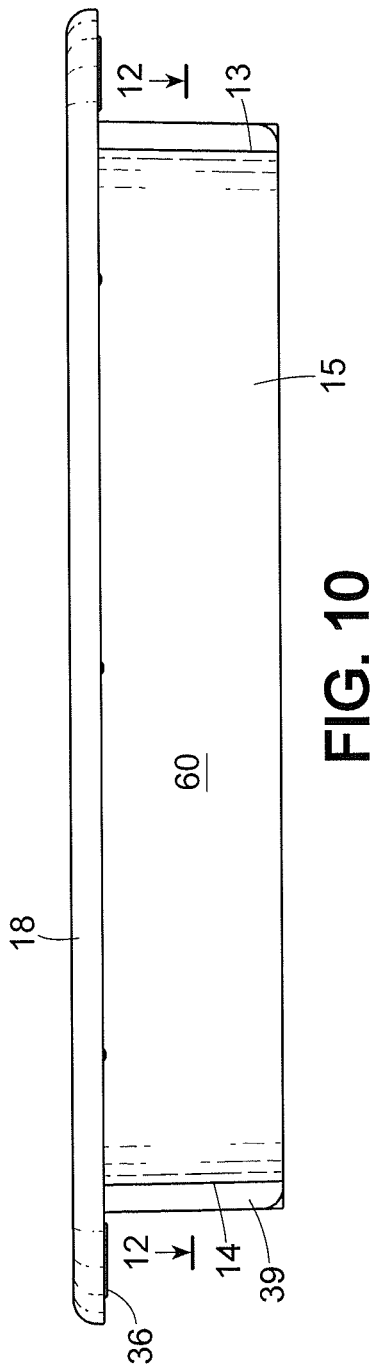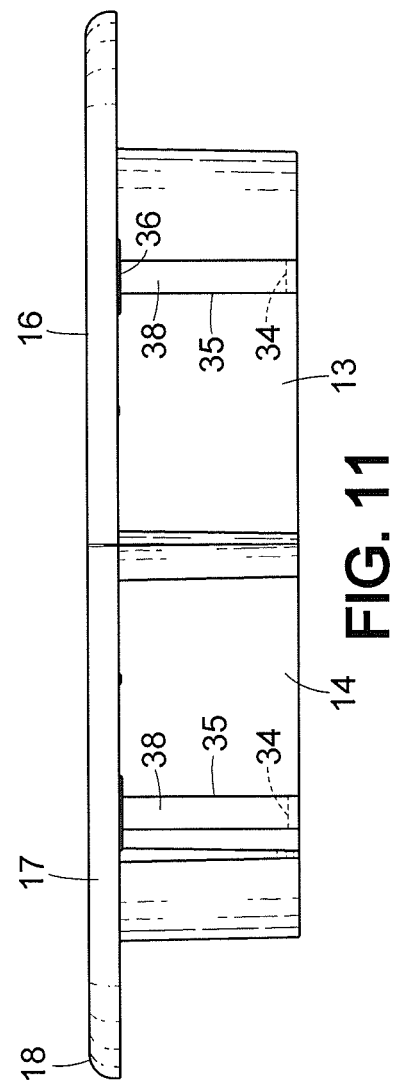

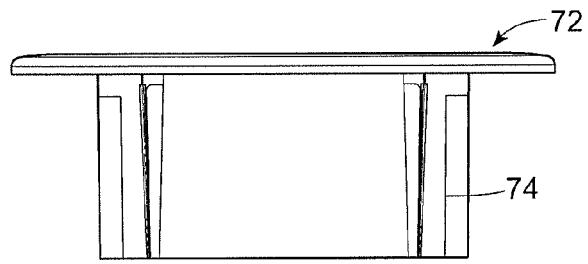
FIG. 19A
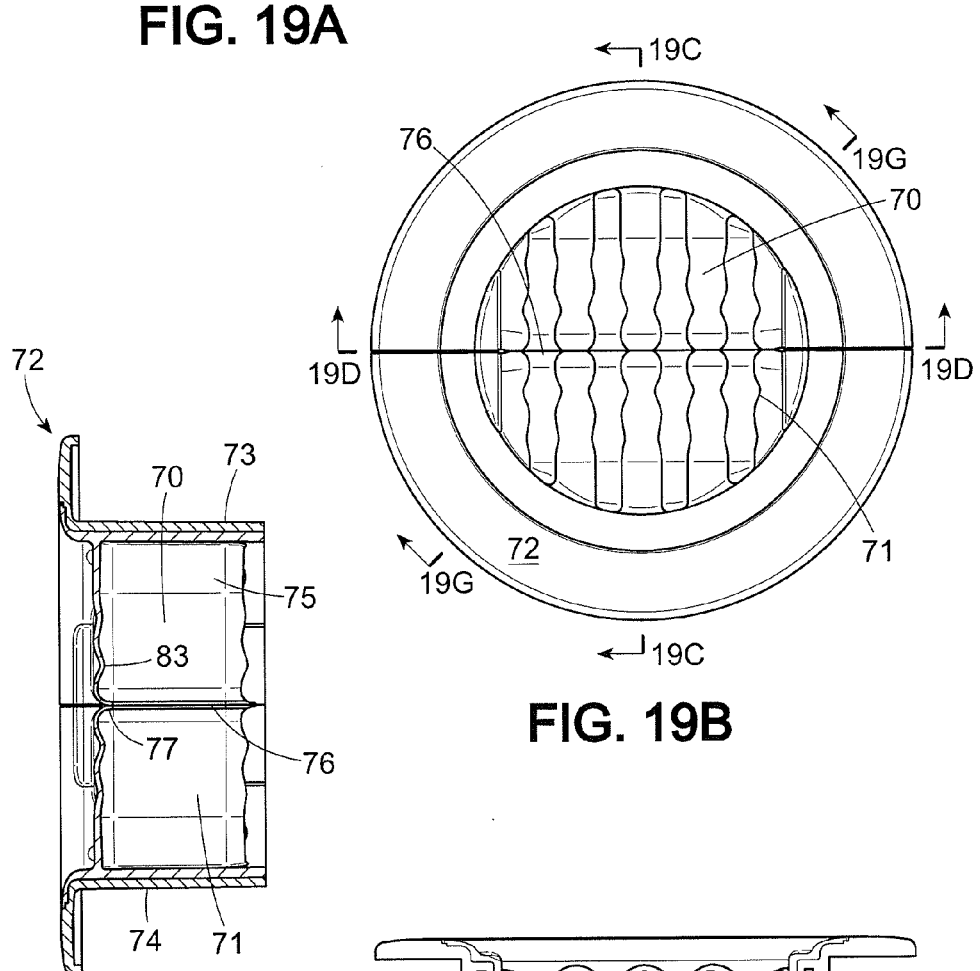
FIG. 19B
FIG. 19C
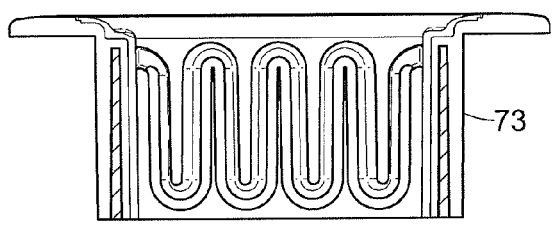
FIG. 19D

FIG. 21
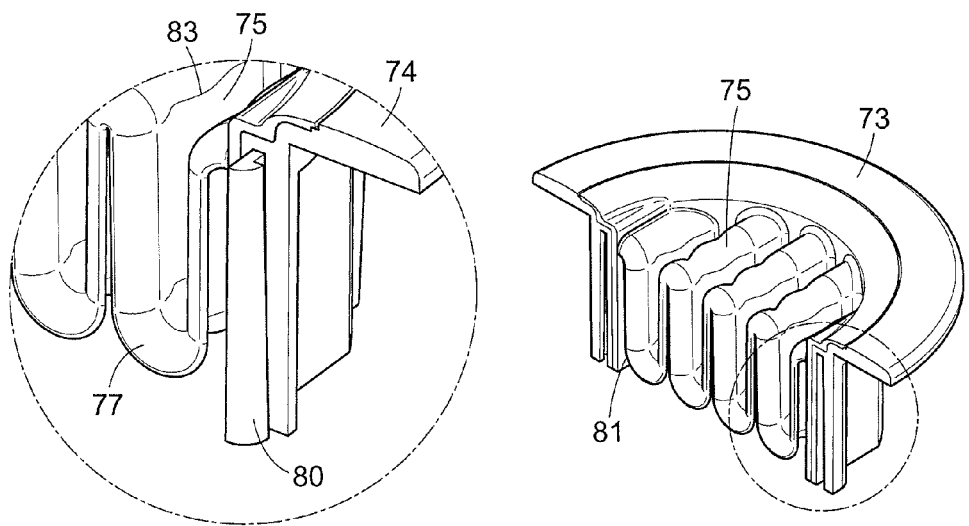
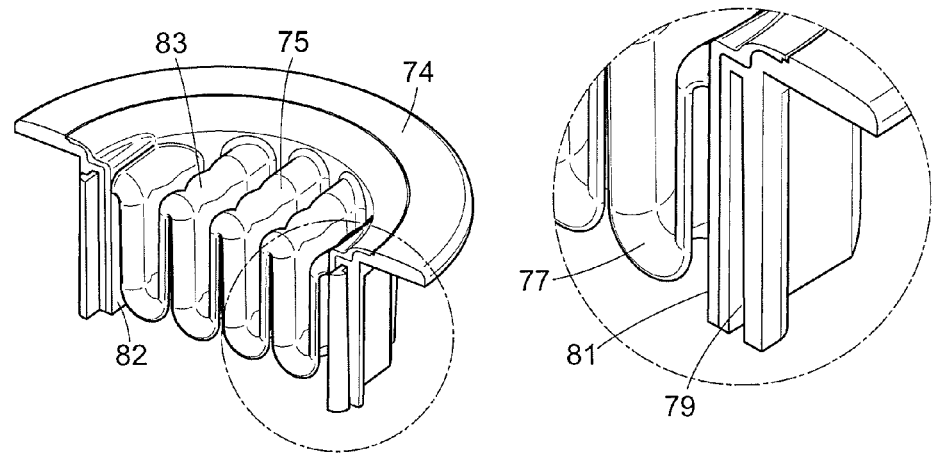

FIG. 23
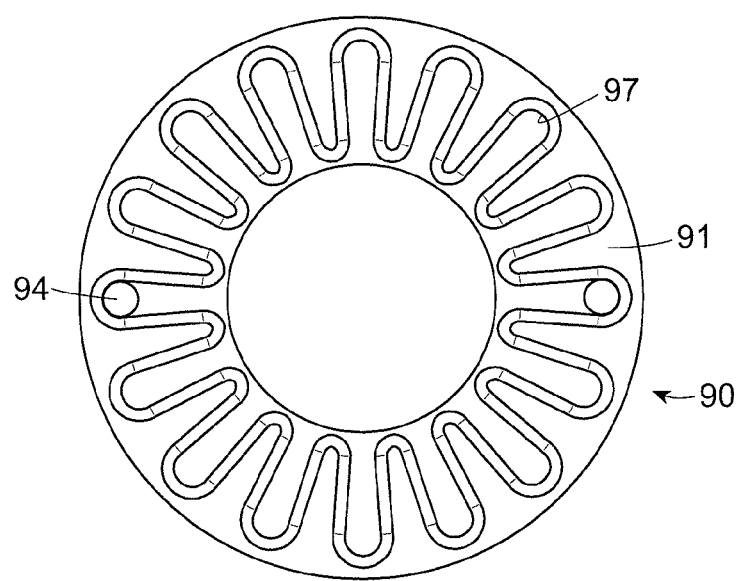
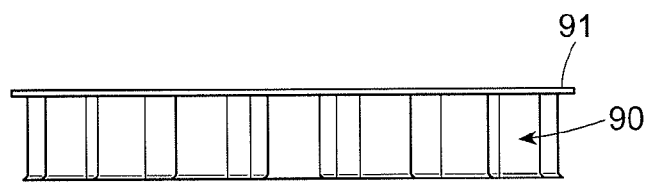

SEALING GROMMET

CROSS-REFERENCE TO RELATED APPLICATIONS

This application claims the priority of Provisional Application No. 61/235,897, filed Aug. 21, 2009, the entire content of which is incorporated herein by reference.

FIELD OF THE INVENTION

The invention relates to grommets and similar devices used for sealing openings in pressurized enclosures such as those provided for supplying conditioned air to electronic equipment in data centers and the like while allowing cables, hoses, conduits and the like to pass through the openings.

BACKGROUND OF THE INVENTION

In data centers in particular, and in a variety of other circumstances as well, there is a need and desire to provide for the passage of cables, conduits, hoses and other pass-through elements, through openings in floors, walls, ceilings, cabinet panels, etc., while providing for effective sealing of the opening and at the same time accommodating the efficient addition and/or removal and/or rearrangement of the pass-through elements as may be required from time to time. A typical data center, for example, will house a large number of computer servers, arranged in racks, which are connected by cables to other servers, networks, etc. These data centers typically are highly dynamic in the sense that equipment is continually being added and removed, rearranged and reconnected, as networks are expanded, and restructured.

Because of significant heat generated by servers in a data center, and the detrimental effect of such heat on computer performance, it is customary to provide for cooling the servers, usually by supplying conditioned air to the equipment racks. To this end a typical data center is constructed with a raised floor, providing a space for cables, hoses, conduits and other service elements, and also functioning as a plenum for the supply of conditioned air. The elements of the raised floor, typically metal "tiles", are provided with specially placed outlet openings for the discharge of conditioned air, for example at the front of a rack of servers. The conditioned air, under relatively higher pressure than the ambient air in the data center, is discharged upwardly along the front of the rack and is drawn into the individual servers by internal blowers provided therein.

Also associated with the server racks are one or more floor openings which allow cables and other service elements to be passed through the floor tiles from the under-floor space, for connecting to the servers. These openings, sometimes referred to herein as service openings, are separate from the before mentioned outlet openings for conditioned air. It is important to minimize the escape of conditioned air through these service openings because air released through these openings simply mixes with ambient air in the data center and does not provide efficient or effective cooling of the servers. At the same time, it is desired to provide for the easy and efficient installation, removal and other rearrangement of service elements in these service openings. Accordingly, any sealing means associated with such openings needs to accommodate such rearrangement while at the same time providing for an effective seal against the undesired loss of conditioned air under pressure from the plenum space below the raised floor.

One particularly advantageous form of seal for achieving the objectives stated above is described in the Sempliner et al U.S. Pat. No. 6,632,999, the disclosure of which is incorporated by reference in its entirety. The '999 patent discloses a form of grommet which includes a frame, positioned in or over a service opening and provided with one or more brush-like elements which extend across the opening of the frame and serve to resist any flow of conditioned air from a pressurized enclosure or plenum space into the ambient air on the opposite side of the grommet. The brush-like elements accommodate the presence of pass-through elements, such as cables, conduits, etc. while substantially minimizing air flow through the opening. The arrangement also accommodates and facilitates the installation, removal and rearrangement of the pass-through elements as is necessary in the dynamic environment of a data center.

SUMMARY OF THE INVENTION

The present invention relates to an improved form of sealing grommet of the general type disclosed in the above-mentioned '999 patent, which incorporates a novel form of impermeable, flexible elastomeric sealing member providing highly efficient sealing under all operating conditions. An almost perfect seal is provided when no pass-through elements are present, and a highly efficient seal is provided when one or more pass-through elements extend through the grommet because the character and configuration of the elastomeric sealing member enable it to closely envelop and form a seal around the pass-through elements and reduce to a practical minimum any open space around them.

In one advantageous form, the grommet of the invention has opposed, impermeable, resiliently deformable, elastomeric sealing members, formed with deep corrugations. The corrugated sealing members provide a highly efficient seal with and without cables passing through the grommet. The impermeable material of the corrugated sealing members allows substantially no air to pass through the interior portion of the sealing members. When the corrugated sealing members are undisturbed (that is, not displaced by a cable or other pass-through element) the corrugations of opposed sealing members preferably are aligned substantially "in-phase" such that the free ends of the opposed sealing members abut one another and form a seal therebetween. When a cable or other pass-through element extends through the grommet, the free ends of the corrugations are displaced away from their "at rest" positions However, the configuration of the sealing members, derived from the deep corrugations therein in relation to the width of the opening, enables and causes the flexible elastomeric sealing members to closely envelop the cable (including very large cables or bundles of cables) and maintain substantial closure of a sealing line between sealing members, even when the cable is displaced from the center of the grommet.

The corrugations of the sealing members preferably are arranged in a repeating wave shape, with semicircular apex and trough portions interconnected by generally vertical side portions. Other repeating and non-repeating (e.g., variable) wave forms may also be suitable, such as a sine wave, square wave, triangle or saw tooth waves and the like.

In certain forms of grommet seals, it may be advantageous to form cross corrugations, particularly near the free ends of the sealing members. The cross corrugations, which can be provided in one or more rows, provide for a softer action at the free ends of the sealing members and can further enhance the ability of the sealing members to closely envelop, and form a seal around, any pass-through elements. The cross corrugations preferably are relatively shallow in comparison to the deep primary corrugations of the sealing member.

The grommet of the invention typically includes a relatively rigid peripheral frame, preferably of a hard plastic material, such as ABS. The frame may be formed from two generally U-shaped half sections, with a resiliently deformable, corrugated sealing member mounted in each half section to form two half-grommets. The two half-grommets, constituting a grommet kit, are joined together when installed to form a complete grommet. A single half-grommet may be utilized in certain circumstances, as where a floor or panel opening abuts a wall or other confronting surface that serves as a boundary against which the open side of the half-grommet is positioned.

Although the sealing members may be fixed to the frame members in various ways, a preferred and advantageous way is to co-mold the elastomeric sealing members with the frames such that the sealing members form a strong bond with the frame sections. To particular advantage, the elastomeric material of the sealing members is electrically conductive, and the co-molding procedure is carried out in such a manner that a portion of the conductive material is caused to flow from inside the frame to one or more locations on the outside of the frame to provide electrical contact with the surface on which the grommet is mounted. (usually a metal tile).

For a more complete understanding of the above and other features and advantages of the invention, reference should be made to the following detailed description and to the accompany drawings.

BRIEF DESCRIPTION OF THE DRAWINGS

FIG. 3 is a top plan view of one form of sealing grommet incorporating features of the invention.

FIG. 4 is a cross sectional view as taken generally on line 4-4 of FIG. 3.

FIG. 5 is a cross sectional view as taken generally on line 5-5 of FIG. 3.

FIG. 7 is a cross section view as taken generally on line 7-7 of FIG. 3.

FIG. 8 is an enlarged, fragmentary cross sectional view of an encircled portion "FIG. 8" of FIG. 7.

FIGS. 10 and 11 are side and end elevational views respectively of the sealing grommet of FIG. 3.

FIG. 19A is a side elevational view of an alternative embodiment of a grommet according invention having a round configuration for use in connection with a circular service opening.

FIG. 19B is a top plan view of the grommet of FIG. 19A.

FIGS. 19C and 19D are cross sectional views taken generally along lines 19C-19C and 19D-19D respectively of FIG. 19B.

FIG. 21 is a collective view of the embodiment of FIG. 19, comprising top and front perspective views of male and female grommet parts and enlarged, fragmentary views showing details of circled portions of the perspective views.

FIGS. 22A and 22B are an exploded view and a top perspective view respectively of another embodiment of the invention, in which the individual corrugated elements of the elastomeric seal are arrayed in a circular configuration, sealing against a floor tile or the like.

FIG. 23 is a collective view comprising a bottom view and a side view of the sealing element incorporated in the embodiment of FIG. 22.

DETAILED DESCRIPTION OF THE INVENTION

Figure 1:
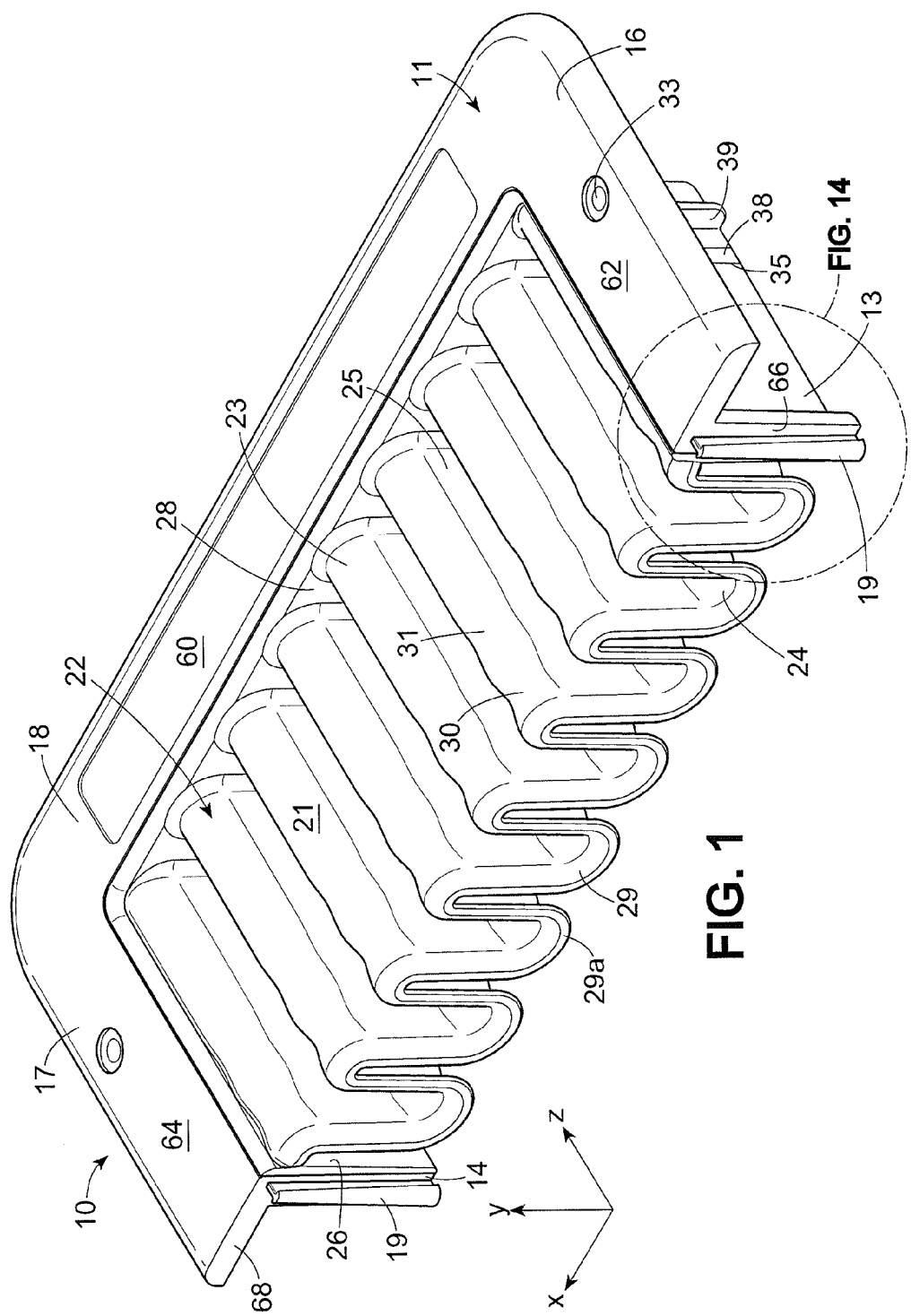
FIGS. 1 and 2 are perspective views from above of "male" and "female" type half sections respectively of one preferred form of sealing grommet according to the invention.

Referring now to the drawings, and initially to FIGS. 1-4 thereof, the numeral 10 designates generally a sealing grommet according to a preferred embodiment of the invention. The grommet comprises an external frame formed of two half-sections 11, 12 of generally U-shaped configuration. Each frame section 11, 12 has a back portion 60 and two opposed side portions 62, 64 extending from opposite ends of the back portion 60. Each of the back and side portions 60, 62, 64 preferably has an inverted L-shaped cross section defined by a vertical wall 13, 14, 15 (see FIG. 7), dividing the frame into inner and outer portions, and an outwardly extending horizontal flange 16, 17, 18. The illustrated grommet is intended to be seated in or over a generally rectangular service opening (not shown) of about 6 by 8 inches in size, although it will be understood that the grommet of the invention may take a variety of shapes and sizes depending upon requirements.

Figure 2:
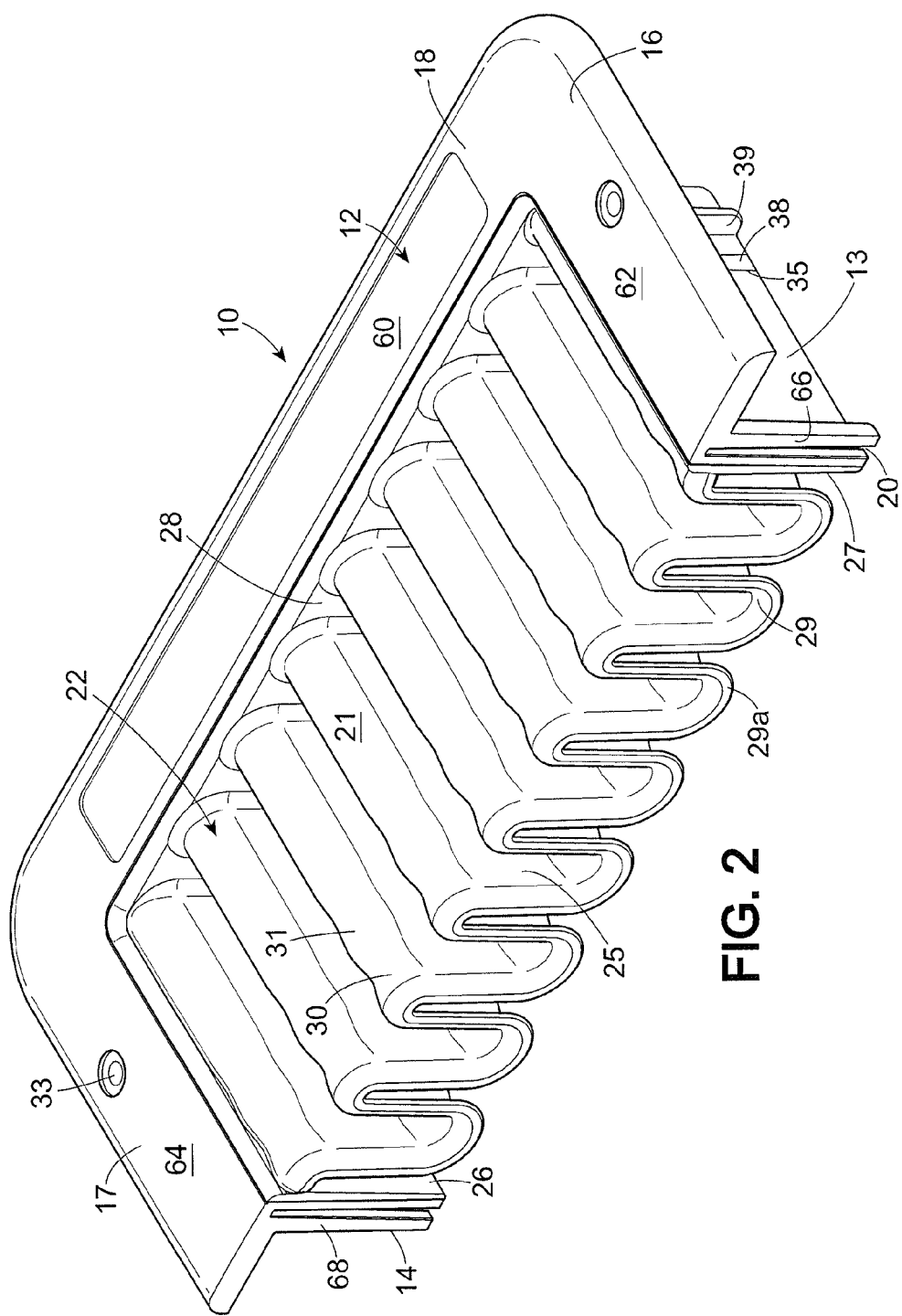
Figure 13:
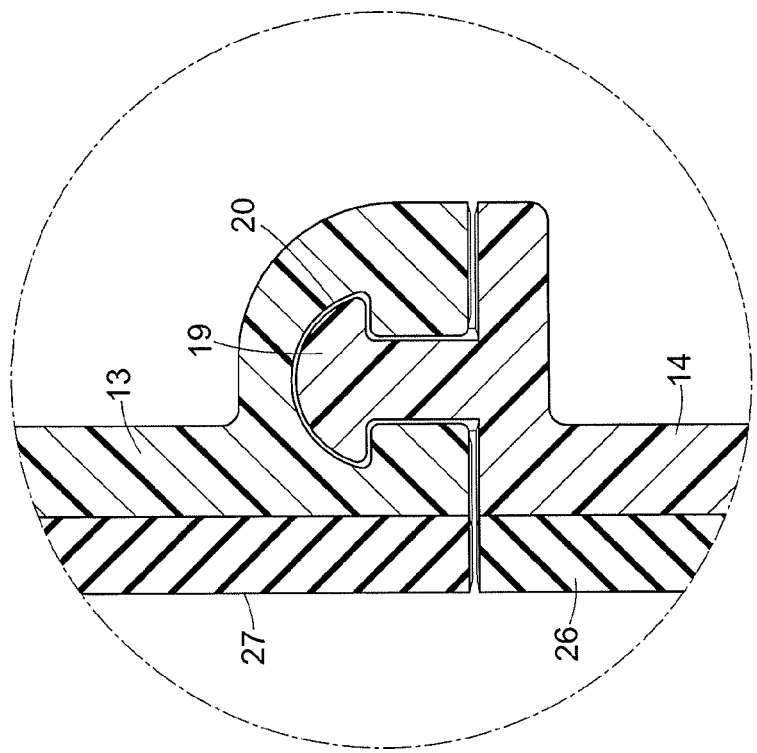
FIG. 13 is an enlarged, fragmentary cross sectional view of an encircled portion K of FIG. 12.
Figure 12:
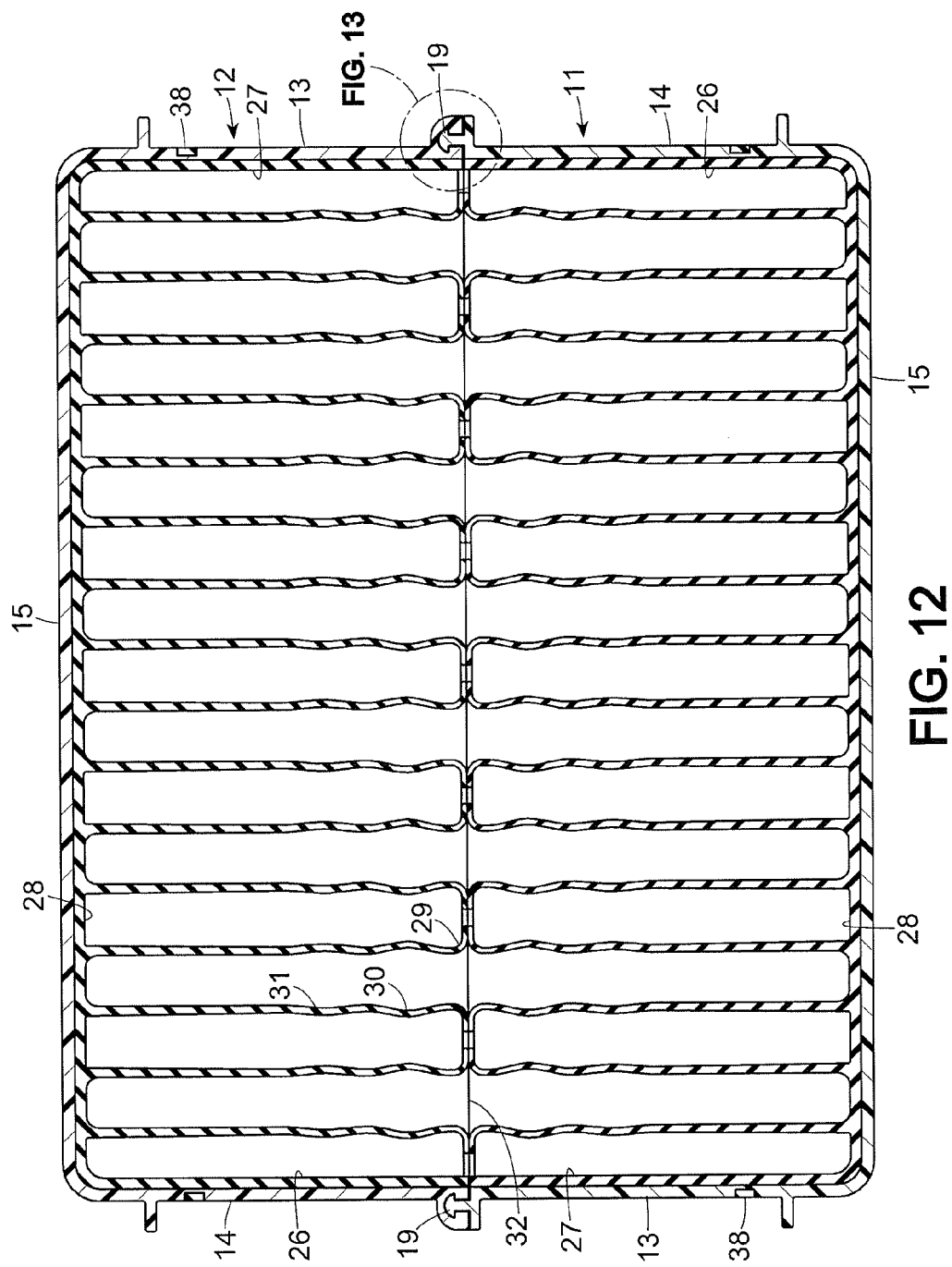
FIG. 12 is a cross sectional view as taken generally on line 12-12 of FIG. 10.
Figure 14:
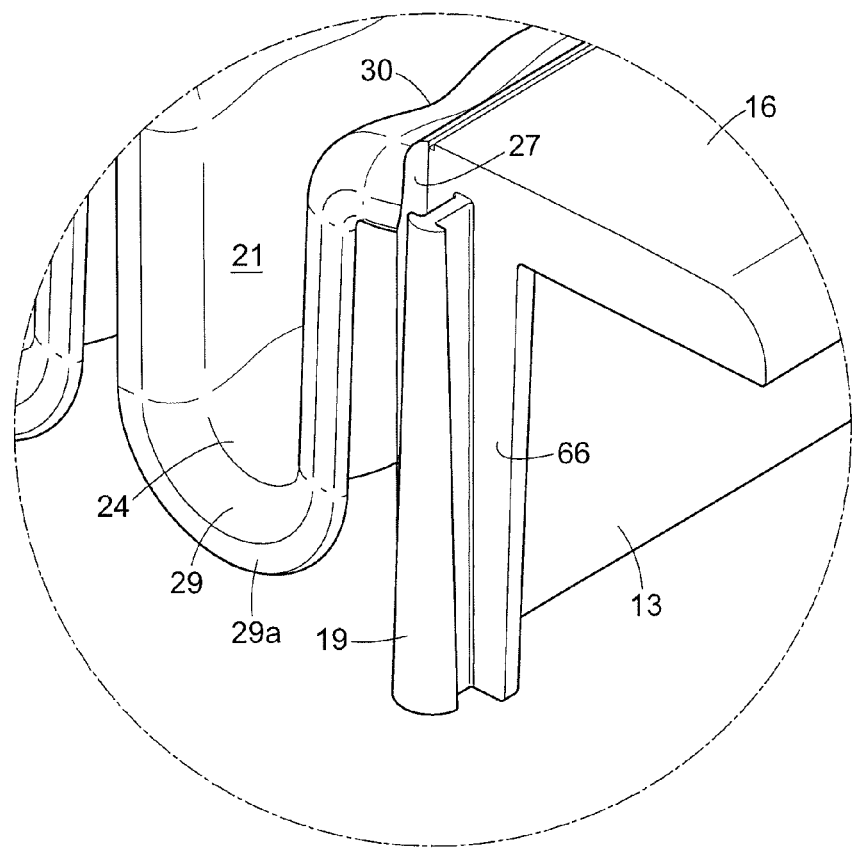
FIG. 14 is an enlarged, fragmentary perspective view of an encircled portion "FIG. 14" of FIG. 1.

FIGS. 1 and 2 illustrate individual half-grommet sections that are configured to be securely but releasably joined together to form a frame of closed, rectangular configuration. To this end, one half section 11 is a "male" section and is provided at free ends 66, 68 of the side portions 62, 64 with vertically extending, tapered tongue elements 19 arranged to be received in complimentary shaped vertical grooves or slots 20 located at corresponding positions in the opposite or "female" half section 12. The slots 20 are open at the bottom and closed at the top, and are tapered to correspond with the taper of the tongue elements 19 to provide a releasable, friction fitting joint when the two frame sections 11, 12 are joined. See FIGS. 12, 13. Desirably, the two frame sections 11, 12 of the grommet are not symmetrical, in that both of the tongue elements 19 are provided on the male frame section 11 and both slots 20 are formed in the female section 12. The free ends 66, 68 of the side portions 62, 64 of the U-shaped female frame section 12 are thus flat and capable of being butted flush to or closely against an external confronting boundary surface, enabling half-sections of the grommet to be utilized in appropriate circumstances.

Pursuant to aspects of the invention, each of the U-shaped frame sections mounts a resiliently deformable sealing member 21 forming an air barrier of unique and advantageous configuration. The sealing member has a corrugated portion formed of a relatively soft and flexible web-like elastomeric material which is impervious to air, and which is shaped in a repeating wave form propagating over at least a portion of the width and/or depth of the sealing member, but more typically from one side portion 62 to the other side portion 64 of the frame and for the full depth of the frame. The corrugated portion has a corrugated free end portion and a base portion opposite to the free edge. The corrugated free end portion is resiliently deformable toward the base portion. Where the corrugated portion extends for the full depth of the sealing member, the base portion will be located at the back portion of the frame.

In the illustrated form of the invention, the repeating wave form is in the nature of a set of deep corrugations 22 defined by apex portions 23 and trough portions 24 of generally semi-circular cross-section and generally vertical wall portions 25 connecting the apex and trough portions. In an illustrative but non-limiting example of the invention, a suitable form of sealing member may have a corrugated wave form in which the corrugations propagate parallel to a horizontal propagation axis (X) (FIG. 1) and oscillate parallel to a vertical oscillation axis (Y) orthogonal to the propagation axis. For a common grommet size having a 8 inch by 6 inch frame opening, an advantageous configuration of the sealing member can be a deeply corrugated form, as shown in the drawings, with a wave length (parallel to the propagation axis X) of about one inch and an amplitude (parallel to the oscillation axis Y) of about 1.5 inches (the term "amplitude", as used throughout, refers to peak-to-trough amplitude of a wave form). The apex and trough portions of the wave may have a radius of about one-fourth inch, with adjacent peaks and troughs being connected by the generally vertical walls 25. The sealing member 21 is resiliently deformable at least in toward the back portion 60 of the frame 11, 12, for example in a deformation direction (Z) orthogonal to both the propagation (X) and oscillation (Y) axes. While the described wave form is particularly desirable, it is contemplated that many other wave forms may also be suitable, as heretofore mentioned.

For practical reasons it is preferable to utilize wave forms of constant wave length and amplitude over the full width of the corrugated portion of the sealing member 21. However, where desired, the wave shape, frequency or amplitude may be varied along the width (propagation axis) or depth (along axis Z) of the sealing member. In general, it is desired that the flat pattern length or arc length (L) of the corrugated portion of the sealing member 21 be from about 2 to about 6 times the width (W) of the corrugated portion, where the arc length (L) is the length of the arc created by the wave form and the width (W) is measured generally parallel to the propagation axis (X). Thus, where the corrugated portion spans from one side portion 62 of the frame to the other side portion 64, the width (W) will be the distance between such side portions. Also, in general, a ratio of amplitude of the wave form to its wave length desirably is a number greater than one. Thus, in the typical and non-limiting example above, a sealing member for a grommet frame having an eight inch opening might advantageously be formed with 8 full corrugations, each having an amplitude of about 1.5 inches, a wave length of about 1 inch, and an arc length of about 3.5 inches. The overall arc length (L) for the eight inch sealing member as described would be approximately 28 inches and the ratio of arc length (L) to width (W) would be approximately 3.5. A preferable ratio of arc length to width is somewhat variable, depending on the nature of the sealing member material, shape and size of sealing member 21, the shape and size of the pass-through element, etc. However, inasmuch as the ability of the sealing member to envelop and seal around a pass-through element positioned in the grommet is a substantial function of the amount of "excess" material surrounding the pass-through element, the ratio of arc length to width should be such as to provide a desired degree of such "excess" material. Typically, a ratio of 2 would be considered to be a practical minimum. Ratios higher than 3.5 may be appropriate where the length of the corrugations (from fixed ends to free ends) is longer than in the example described herein, for example, or where the material of the sealing members is less flexible.

To provide for mounting of the sealing member 21 in the frames 11, 12, the sealing members advantageously are formed with side flanges 26, 27, extending vertically from the end-most corrugations, and a vertical back flange 28 which extends along the full width of the sealing member and which is integral with the back ends of the corrugations 22. Preferably, the side flanges 26 and 27 join with the back flange 28 at the corners (see FIG. 12) and form a three-sided, U-shaped support for the sealing member. The sealing members can be mounted to the frame elements 11, 12 by securing the side and back flanges 26, 27, 28 to the respective side and back walls 13, 14, 15 of the frame sections. This can be done by fasteners, adhesives, etc., but preferably and in accordance with a feature of the invention the sealing member is co-molded to the frame such that the flanges 26, 27, 28 are mold-bonded to the frame walls 13, 14, 15. This provides a far superior joining of the components and provides manufacturing economies as well. The co-molding procedures require certain compatibilities between the frame material and the material of the sealing members, to be described hereinafter.

As shown in FIGS. 1 and 2, the corrugations 22 are integral with and fixed at their back ends to the back flange 28 and extend in cantilever fashion from the back flange to a point slightly beyond (for example, about 0.010 inch beyond) a sealing plane 32 connecting the outer ends of the side portions 62, 64 of the frame 11, 12 (ignoring the tongues 19 in the case of the frame 11). The arrangement is such that, when two frame sections 11, 12 are joined in the manner heretofore described, the corrugated portions of the sealing members will interfere slightly and thus be slightly compressed to assure an effective seal along the sealing plane on which the two sealing members abut. Additionally, the corrugations 22 of the respective grommet sections 10 are aligned in phase, such that the outer end edges of the corrugations of one sealing member follow and directly abut the outer end edges of corrugations of the other sealing member.

In a particularly advantageous embodiment of the invention, the corrugated free end portion of the sealing member 21 is formed with an end flange 29 which broadens the end surface of the corrugations. The end flanges of opposed sealing members can thus remain in sealing contact even though the opposed corrugations become slightly out of phase during use, as when portions of the sealing members are displaced by pass-through elements, or by temporary displacements resulting from repositioning or removing pass-through elements. In the illustrated embodiment, the end flange 29 preferably is in the form of an arcuate portion which terminates in a flat outer end portion 29a. The flange 29 turns downwardly and the outer end portion 29a is disposed substantially at right angles to the web material of the sealing member, substantially parallel to the sealing plane 32 containing the ends of the primary corrugations. To advantage, the thickness of the material forming the corrugations 22 is tapered slightly from the fixed ends thereof to the corrugated free end portion. As an illustrative and non-limiting example, the material may have a thickness of about 0.075 inch at the fixed end thereof and taper gradually or in steps toward the corrugated free end portion thereof to a final thickness of about 0.045 at the end flange portion 29.

Figure 15:
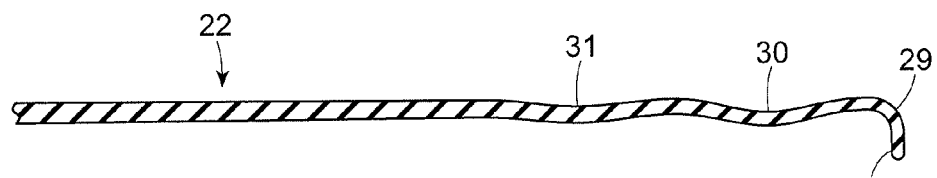
FIG. 15 is an enlarged, fragmentary cross sectional view as taken generally on line 7-7 of FIG. 3, illustrating further details of grommet construction.

As illustrated particularly in FIGS. 1 and 2, and in FIG. 15, and in accordance with certain aspects of the invention, the outer end portions of the corrugations 22 may advantageously be formed with a set of one or more relatively shallow secondary (or "cross") corrugations 30, 31 which facilitate displacement of the primary corrugations 22 caused by the presence of a pass-through element and also improve the ability of the sealing member to envelop and seal around a pass-through element while elsewhere maintaining closure along the sealing plane 32 between opposed sealing members. In the form of the invention illustrated in FIGS. 1, 2 and 15, the sealing member 21 includes a first (outer) secondary corrugation 30 and a second (inner) secondary corrugation 31. The amplitude of the secondary corrugations may decrease from the outer to the inner secondary corrugation. For example, the outer secondary corrugation 30 may have an amplitude of about 0.050 inch, while the inner secondary corrugation 31 may have a lesser amplitude of about 0.025 inch. The wave length of the secondary corrugations may be constant at about 0.67 inch. In practical embodiments of the invention, a ratio of amplitude to wave length of the secondary corrugations may be in a range of from about 1:13.5 to about 1:27. The amplitude of the secondary corrugations is significantly less than a typical 1.5 inch amplitude of the primary corrugations 22.

The secondary corrugations 30, 31 preferably propagate parallel to a secondary propagation axis (Z) which is orthogonal to both the propagation (X) and oscillation (Y) axes of the primary corrugations. The secondary propagations oscillate normal (i.e., perpendicular) to the surface of the primary set of corrugations.

In a preferred embodiment of the invention, the corrugated sealing members 21 are formed by co-molding of the sealing members with the frame sections 11, 12. The co-molding operation involves placement of pre-formed frame sections into a mold and thereafter injecting the material of the sealing member into the mold. The co-molding operation simultaneously forms the sealing member and bonds its side and back flanges 26, 27, 28 to side and back walls 13, 14, 15 of the frame section. To this end, the respective materials of the frame sections and the sealing members must be compatible in order to achieve a desired molecular bond between the frames and sealing members. Desirably, the frame sections may be formed of a blend of polycarbonate and a styrene based material such as ABS. Such a material has the strength and rigidity desired for the frame and also the necessary fire rating for the intended service. A suitably compatible material for the sealing members 21 is a thermoplastic elastomer commercially available from the RTP Company of Winona Minn. A particularly desirable thermoplastic elastomer is offered by the RTP Company as of the filing date hereof under its designation RTP 2099 E x 123155A. The indicated material is flexible and soft, with a Shore durometer of approximately 47A, has the necessary fire rating (UL94-40) and, importantly is electrostatically dissipative (ESD) so as to be able to dissipate electrostatic charges that may develop in normal operations of a data center.

Although a thermoplastic elastomer material is particularly desirable for use in the grommet of the invention, other materials can be used to advantage with an acceptable level of performance. For example, non-thermoplastic elastomers or incompatible elastomers may be utilized where a molecular bond between the frames and the sealing members is not a requirement. In such cases, the sealing members may be secured to the frames by suitable adhesives and/or mechanical fasteners.

In order to take full advantage of the ESD characteristics of the thermoplastic elastomer, provisions are made for causing a portion of the elastomer to flow during the molding process to positions in which contact areas 36 formed thereby will be in electrical contact with a floor tile or other grommet-supporting structure when the grommet is mounted in a service opening. For example, the elastomer may flow underneath the outwardly extending horizontal frame flanges 16, 17 such that, when the grommet is installed on an electrically conductive floor tile (typically used in data centers) or other conductive surface, the material of the sealing member 21 will be in electrical communication with the floor tile to provide one or more conductive paths from the sealing members for electrostatic discharge. To advantage, the contact areas 36 positioned under the flanges 16, 17 fully or partially encircle, or are otherwise closely associated with, fastener openings, such as screw holes 33, formed in the flanges for securing the grommet in place. When the grommet frame is installed and secured with screws or other fasteners (not shown) the underlying elastomer contact areas 36 are compressed into good electrical contact with the conductive support surface below.

Figure 6:
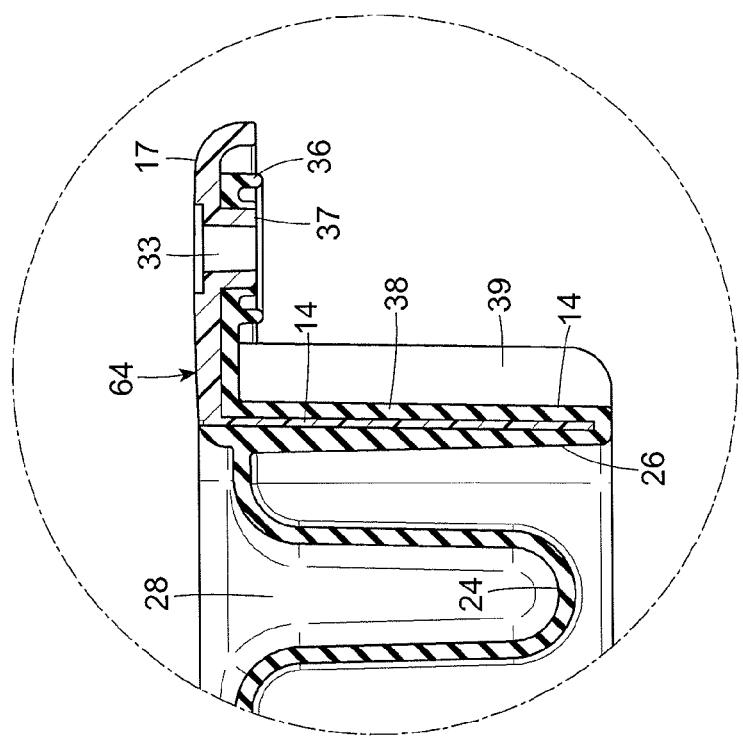
FIG. 6 is an enlarged, fragmentary cross sectional view of an encircled portion "FIG. 5" of FIG. 5 showing structural details.
Figure 9:
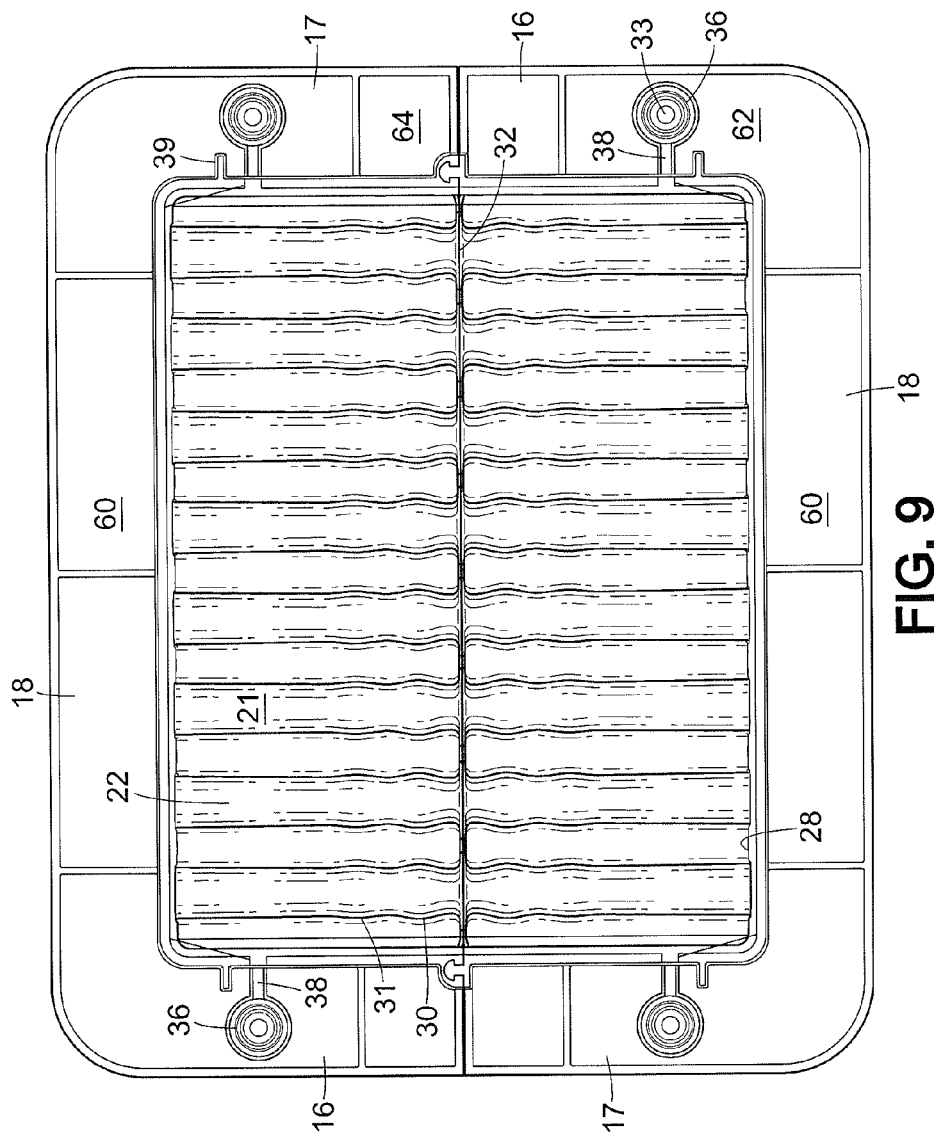
FIG. 9 is a bottom plan view of the sealing grommet of FIG. 3.

Various arrangement can be provided for causing a flow of elastomer underneath the flanges 16, 17, for example, providing one or more gate openings (not shown) in upper portions of the side or back walls 13, 14, 15. One preferred arrangement, however, is to provide one or more flow paths, comprising notches 34 (FIG. 11) in the bottoms of side walls 13, 14 and flow channels 35 in outside surfaces of such walls, to allow an interconnecting portion, preferably in the form of a narrow strip 38 of elastomeric material, to flow underneath the walls 13, 14, upward along the outside surfaces thereof and then outward under the horizontal flanges. The notches 34 and channels 35 preferably are aligned with the screw holes 33, and channeling means are provided under the horizontal flanges and/or in the mold to cause the conductive elastomer to flow outward along the bottom of the horizontal flange and preferably to fully or partially encircle the screw hole 33 as shown at 36 in FIGS. 6 and 9. The encircling contact areas 36 of the elastomer preferably project a short distance (for example, about 0.015-025 inch) below the bottom of the horizontal flange material 37 surrounding the screw hole 33 such that, when the grommet is installed in a service opening, the flange 16, 17 initially rests upon the encircling contact portions 36. When the grommet is tightened down with screws or other fasteners, the encircling contact areas 36 are compressed to establish a desired level of good electrical contact.

Preferably, the contact areas 36, interconnecting portions 38 and corrugated portions are integrally formed in the molding process, such that the interconnecting portions connect the corrugated portion with the contact areas forming a continuous electrical path for discharge of an electrical charge from the sealing member to the flooring or other grommet-supporting structure.

In the illustrated and preferred embodiment of the invention, the side walls 13, 14 of the frames 11, 12 are formed with vertical fins 39 which project from a position adjacent to the strips 38 of conductive elastomer extending vertically along the end walls. The fins 39 serve, among other things, to position the grommet in a service opening and to protect the conductive strips from abrasive contact with other surfaces which might degrade or interrupt the conductive pathway provided by the strips.

Figure 16:
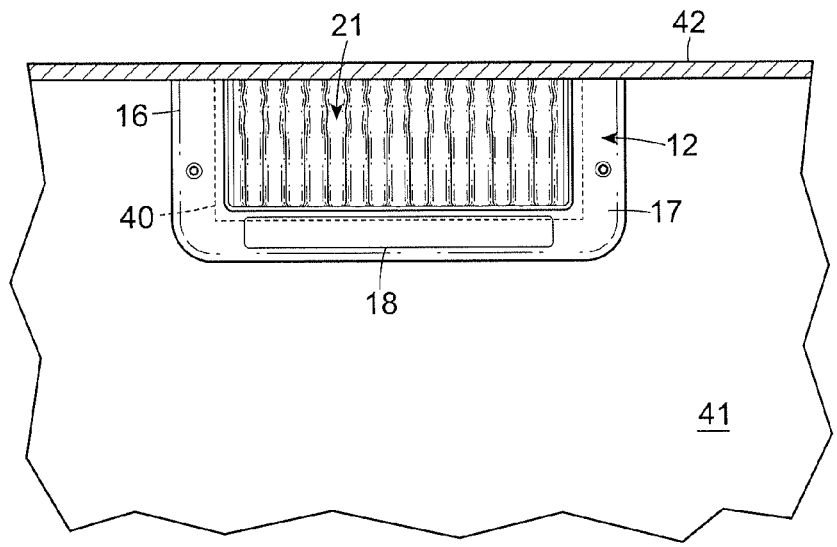
FIG. 16 is a simplified schematic view illustrating the use of a half grommet according to the invention used for sealing an opening in a floor, panel or the like, where one side of the opening is defined by a wall or other surface disposed at right angles thereto.

Although typical usage of the grommet sections of FIGS. 1 and 2 involves assembling the two half frames to form a grommet of closed configuration, there are various circumstances in which a single U-shaped grommet frame may be preferred. One such circumstance is shown in FIG. 16, wherein it is desired to seal a service opening 40 in a floor, cabinet, panel or other support surface structure 41, where the service opening 40 is defined in part by the surface structure 41 and in part by an adjacent boundary structure 42, such as a wall disposed, for example, perpendicular to the surface structure 41 and forming a confronting boundary surface. In such a case it is feasible, and in some cases preferable, to install a single half section of a grommet into the service opening, with the exposed outer edges of the corrugated portion of the sealing member 21 positioned against the boundary structure 42. For this configuration, a half grommet section formed with a female frame section 12 would be chosen in preference to one formed a male section 11, to enable the ends of the side portions 62, 64 of the frame section 12 to be positioned flush against the boundary structure 42.

Preferably, when the grommet half section 12 in installed in the service opening 40, the ends of the frame side walls 13, 14 are positioned against the confronting surface defined by the boundary structure 42. Because the corrugated free end portion of the corrugated portions of the sealing element projects slightly beyond the ends of the frame wall, this will cause the ends of the corrugations to be compressed slightly (e.g., 0.010 inch) to assure an excellent seal.

Although sealing grommets according to the invention can be employed in a variety of ways, a common usage is in connection with raised flooring structures of the type typically employed in data centers. Such raised flooring provides under-floor space for wiring and other service elements connected to servers and other electronic devices housed at the data center, and also forms a plenum space for supplying conditioned air under pressure for cooling of the devices. A typical such arrangement is shown schematically in FIG. 17, which illustrates a raised flooring structure 43 supported above a base floor 44, typically by spaced apart vertical supports (not shown). An equipment rack 45 is supported on the raised floor 43, and typically contains a number of devices (not shown) that may be operating on a 24/7 basis.

Closely adjacent to the equipment rack 45, the floor 43 is provided with one of more air discharge openings 46, which allow conditioned air supplied via a plenum space 47 between the base floor 44 and raised floor 43 to flow out of the plenum space. The discharge openings 46 are of a suitable size, shape, number and location to provide for a desired level of cooling air flow to the rack 45, typically upwardly along the front of the rack, allowing the devices to draw in the cooling air by means of internal fans. Also adjacent to the rack 45 is a service opening 48, through which wires, cables and other service elements 49, 50 are passed. The service elements 49, 50 extend through the plenum space 47 and exit through the service opening 48, which is separate from the air discharge openings 46 and may be spaced some distance therefrom. Elements extending though a given service opening may be connected to one or more racks, depending on the arrangement of a particular data center.

Figure 17:
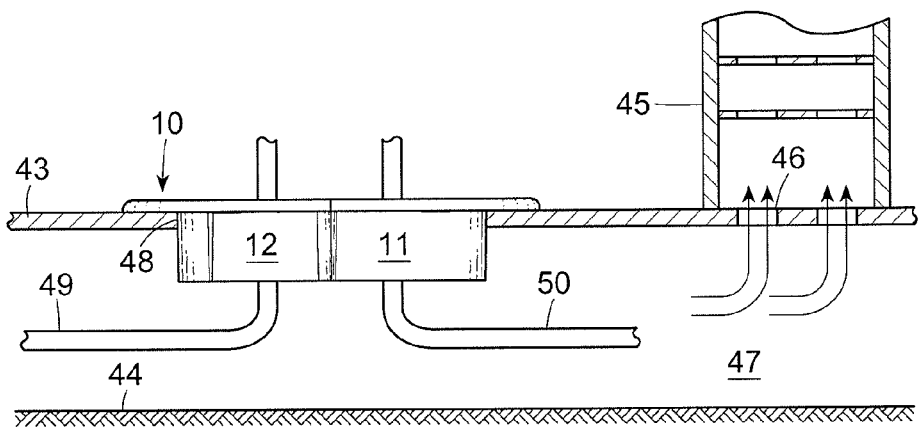
FIG. 17 is a simplified schematic view illustrating the use of a sealing grommet according to the invention in connection with a plenum providing a space for service elements and supplying conditioned air under pressure for controlled discharge through selected openings

In the arrangement of FIG. 17, a sealing grommet 10, formed of a pair of grommet half sections 10, 11 is installed in the service opening 48 to allow the service elements 49, 50 to pass through the service opening while substantially sealing the opening against the unintended loss of conditioned air into the ambient space. The two half sections, which may be assembled on-site, enable a grommet to be installed without requiring existing service elements to be disconnected. Likewise, in order to install new service elements, or re-arrange previously installed elements, the grommet sections can be separated easily, if necessary, to facilitate access to and through the service opening 48.

Figure 18:
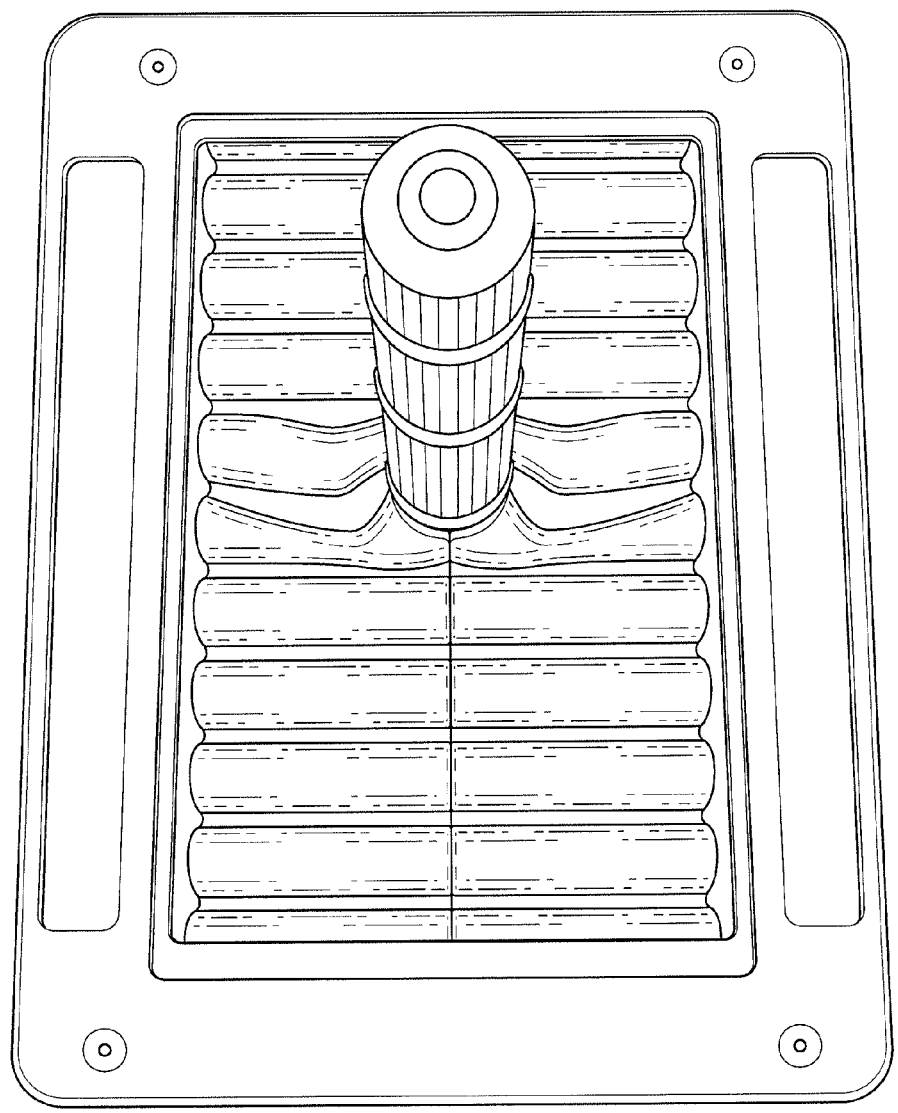
FIG. 18 is a top view of an alternate form of the new grommet showing a pass-through element enveloped by the grommet seal.
Figure 19E:
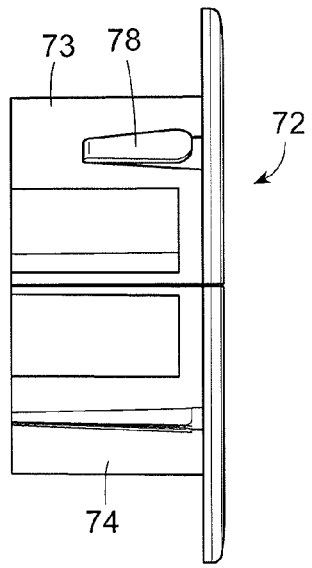
FIG. 19E is an end elevational view of the grommet of FIG. 19A.
Figure 19F:
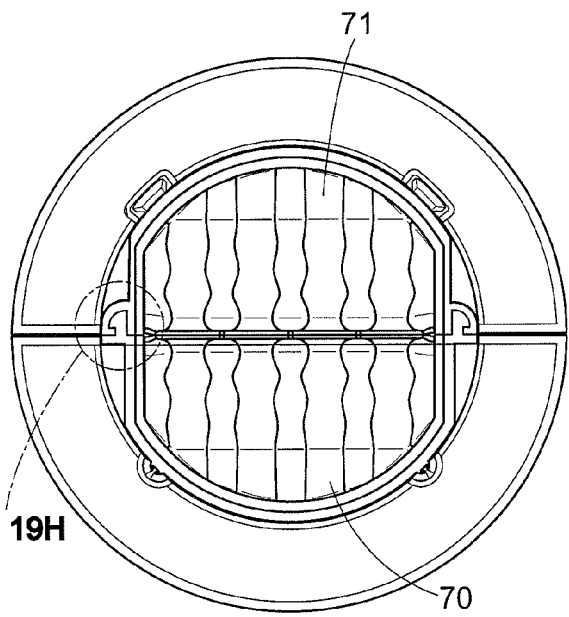
FIG. 19F is a bottom plan view of the grommet of FIG. 19A.
Figure 19G:
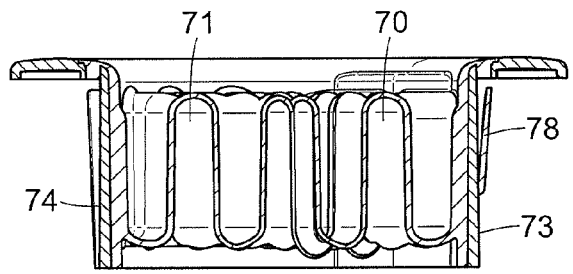
FIG. 19G is a cross sectional view as taken generally along line 19G-19G of FIG. 19B.
Figure 19H:
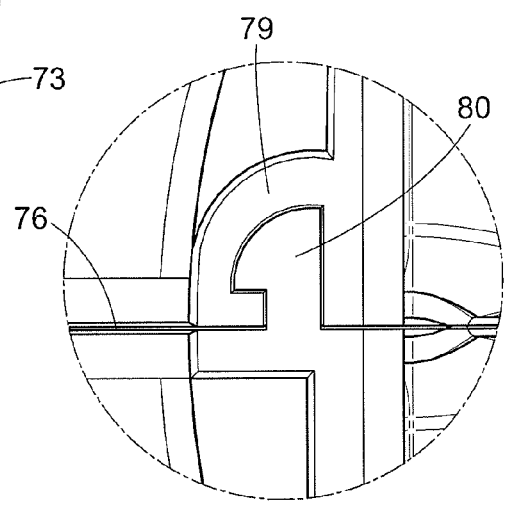
FIG. 19H is an enlarged fragmentary view of a portion of the grommet shown in the encircled portion of FIG. 19F.

FIG. 18 illustrates an alternate and simplified form of sealing grommet according to aspects of the invention, in which a corrugated form of grommet seal has neither cross (secondary) corrugations nor flanges at the free ends of the corrugations. The illustration of FIG. 18 shows a relatively large diameter (e.g., greater than one inch) service element passing through a standard 6 inch by 8 inch grommet opening sealed by two opposed, corrugated sealing members. It can be seen in FIG. 18 that the corrugated sealing members, although considerably displaced and distorted, are able to closely and sealingly envelop the service element and substantially close together along the central sealing line. The sealing grommet of the invention thus provides a significantly superior air barrier seal than sealing grommets of heretofore known types while retaining or improving upon other advantageous features of known grommets.

It will be evident that grommets and other seals incorporating the principles of the invention need not be in the specific form herein illustrated. A grommet section may, for example be formed in an extended length and may be adapted to be cut to desired lengths at a job site and/or joined with other sections, if desired. The seals may also be employed for purposes other than the accommodation of pass-through elements, as in forming a seal between two extended panel sections, such as a floor and wall.

In addition, although the sealing members of the invention may be manufactured by molding processes, and particularly co-molding to frame sections, other procedures may be employed to derive the desired forms of sealing members.

The illustrated form of corrugated sealing member is both efficient and easily manufactured. However, other repeating or non-repeating (e.g., variable) wave forms (or other shapes) may be utilized in the design and manufacture of corrugated sealing members. It is advantageous that the wave form of the corrugated portion has an arc length (L) significantly in excess of the width (W) of the corrugated portion (or of the opening between the side portions of the grommet frame). Preferably, the ratio of L to W is between about 2:1 to about 6:1 so that, when a pass-through element is accommodated in the grommet, the substantial "excess" arc length of the corrugated portion of the sealing member enables the edge of the sealing member to partially unfold at the location of the pass-through element and to partially surround and envelop the pass-through element to both seal around the pass-through element and to close the sealing line along which a pair of sealing members meet.

Where a grommet of closed configuration is assembled from a pair of opposed half sections, it is not necessary that the sealing line along which the respective sealing members meet be a straight line. In this respect, the corrugated free end portion could be of arcuate, wavy or other configuration (as viewed from above) as long as the edge configurations of a pair of sealing members are complementary such that, in the absence of a pass-through element, the corrugated free end edge portions contact each other over the full length of the sealing line.

While the grommet of the invention is best manufactured in two mutually engageable half sections and is most useful when manufactured in two sections, many of the benefits of the invention may be realized in structures in which one or more wave form sealing members are incorporated into a one-piece frame of closed configuration.

The various forms of the invention illustrated hereinabove relate to grommets with corrugated portions that are configured in flat form, where the propagation axis of the primary corrugations is linear. However, it will be understood that the corrugated portion the grommet may be formed as an arc or cylinder, or wave form, for example, in which case the propagation axis of the primary corrugations would be correspondingly non-linear, such as arcuate, cylindrical or wavy. For example, such a non-linear propagation axis could be an arc or spline in a plane parallel to a plane defined by the (X) and (Y) axes. Alternatively, the corrugated portion could be fan-shaped, with the propagation axis being an arc in a plane parallel to a plane defined by the (X) and (Z) axes. The function such grommets would be the same as above described, in that the corrugated free end portion of the non-linear corrugated portion would form a seal in cooperation with a boundary surface (planar or otherwise), for example, or with a second grommet part of similar or complimentary non-linear configuration, or a mating pair of arcuately configured sealing elements could be mounted in a single closed frame of corresponding arcuate shape.

Figure 20A:
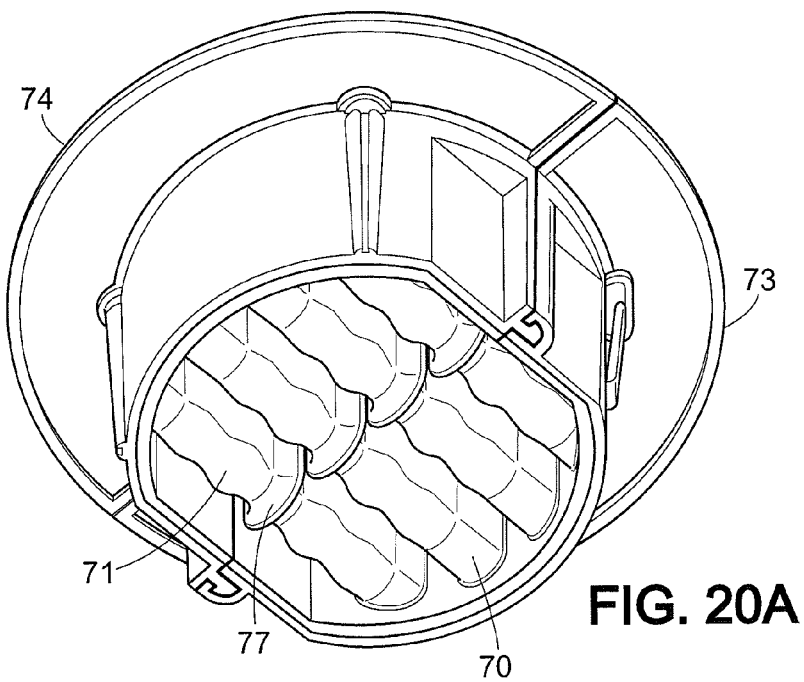
FIGS. 20A and 20B are bottom and top perspective views respectively of the grommet shown if FIGS. 19A-19G.
Figure 20B:
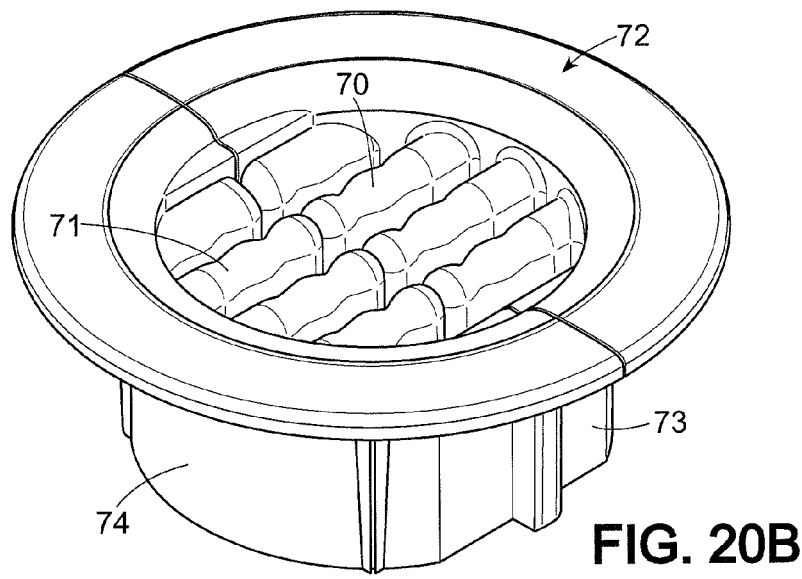

FIGS. 19-21 illustrate an embodiment of the invention in which corrugated sealing members 70-71 of the general type shown in FIGS. 1-17 are configured to be mounted in a circular frame 72, advantageously formed by two semi-circular half-sections 73, 74. The corrugations 75 of the sealing members are aligned in the same direction, perpendicular to a sealing plane 76 extending between the sealing members 70, 71. The corrugated free end portion of each sealing member would project slightly beyond such sealing plane, absent the opposing sealing member. Thus, the sealing members are compressed when the frame sections are assembled. The characteristics of the sealing elements preferably are as above described with respect to operative ratios of width to arc length, amplitude to wave length, preferred materials, etc. To advantage, the main or primary corrugations 75 are formed with secondary or cross corrugations 83 as heretofore described in connection with the embodiment of FIGS. 1-17.

The two corrugated sealing members 70, 71 are positioned to abut each other with their respective corrugated portions in phase, as shown best in FIG. 20. The corrugations 75 of the sealing members also preferably have downturned flanges 77 which maintain an effective seal even if the opposed corrugations become slightly misaligned in use.

As shown particularly in FIGS. 20 and 21, the sealing members 70, 71 are formed with generally semi-circular, vertically extending flanges 81, 82, respectively, integral with the corrugations 75. The flanges 81, 82 serve the function of the back and side flanges of the previously described embodiment. In this respect, in a particularly preferred embodiment, the sealing members can be co-molded with the frames 73, 74 to provide an extremely strong bond between the frames and sealing members. Additionally, the side walls and/or outwardly extending horizontal flanges of the frames 73, 74 may be provided with openings (not shown) to permit a flow of the material of the sealing members (e.g., thermoplastic elastomer) underneath the outwardly extending horizontal flanges so that the material, preferably somewhat electroconductive, makes good contact with the floor tile and provides a path for the dissipation of electrostatic charges from the sealing members.

The two half sections 73, 74 of the grommet frame are provided respectively with slots 79 and tongues 80 to accommodate assembly of the two half-sections around service elements (not shown) already in place in a service opening.

The circular grommet of FIGS. 19-21 is intended for "toolless" installation, in that it can be snapped or friction fit, or otherwise securely placed in an opening in a floor tile, cabinet, panel, etc. (not shown) without the use of a hand tool or the like. To this end, clip elements 78 may be formed on the exterior walls of the frames 73, 74 to engage the floor tile when the frame is inserted. Where appropriate, fastening elements (not shown) may be used to secure the grommet flanges to an underlying support surface In another preferred embodiment of the invention, shown in FIGS. 22-24, a sealing member 90 is of a cylindrical form, with the propagation axis of its corrugated waves 97 forming a circle and the oscillation axes of the waves being radially disposed. The sealing member has an integral, annular top flange 91 which is co-molded with or adhesively or otherwise joined with a backing plate 92. The backing plate 92 is provided with two or more spacer posts 93 arranged to pass through openings 94 in the annular top flange 91. The grommet, in operation, is positioned over a service opening 95 in a floor tile or other panel 96 and secured thereto by suitable screws or other fasteners (not shown) directed through the spacer posts. The length of the spacer posts advantageously is such that the lower ends of the corrugations 97 are slightly compressed against the surface of the tile or panel 96. In a preferred form, the corrugations 97 are formed with outturned flanges 98 in the same manner as previously described embodiments.

Figure 22A:
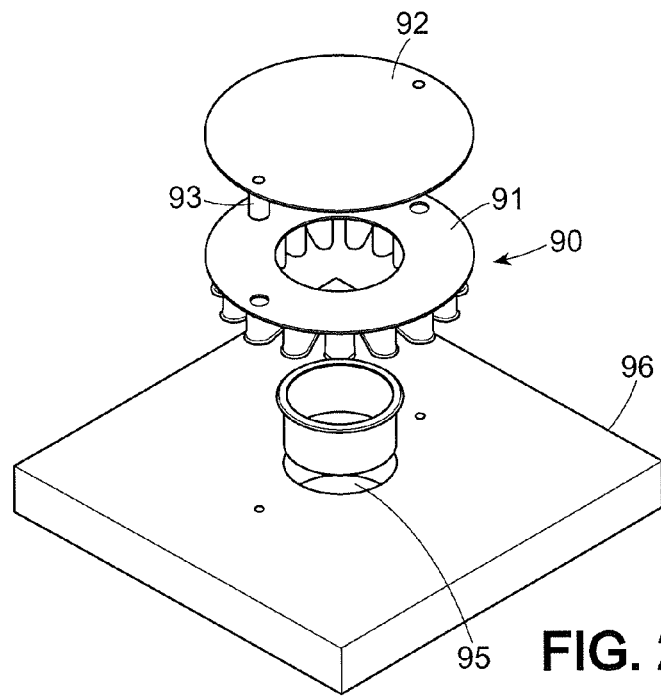
Figure 22B:
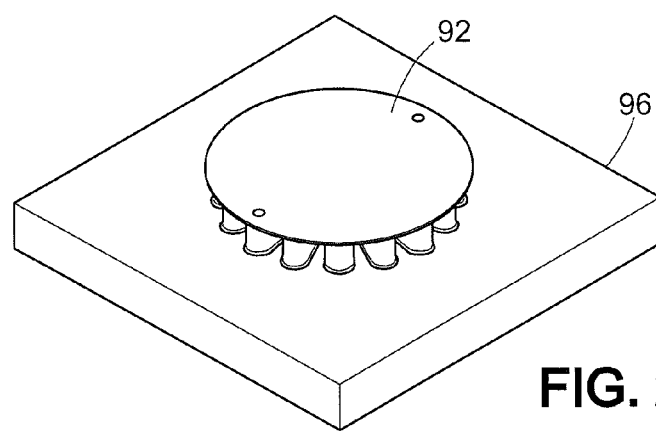
Figure 24:
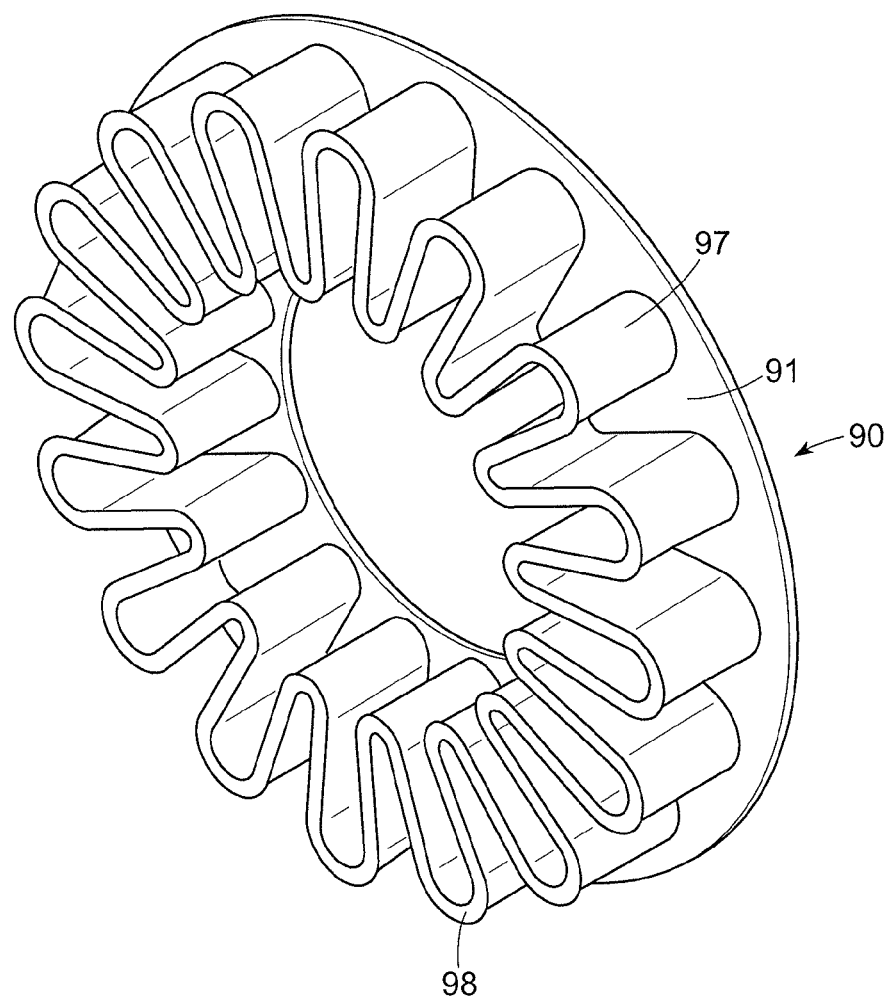
FIG. 24 is a bottom perspective view of the sealing element of FIG. 23.

In the operation of the grommet of FIGS. 22-24, the sealing member 90 of the grommet forms a seal surrounding the service opening 95. Cables and other service elements (not shown) can be passed through the opening and between the flanged lower ends of the corrugations 97 and the surface of the tile or panel 96. The deep corrugations of the sealing member cause and enable the material thereof to closely envelop and seal around the service elements in a highly efficient manner, with minimal leakage of conditioned air. The function of the circular grommet form is much the same as that of the half-grommet shown in FIG. 16, where the sealing element is confronted by a boundary surface, such as a wall. In the case of the circular grommet, the confronting boundary surface is the tile or panel.

If desired, the corrugations 97 of the grommet of FIGS. 22-24 can be splayed outwardly from top to bottom in the form of a truncated cone instead of the illustrated cylindrical configuration.

A grommet of the general type shown in FIGS. 22-24 may also be formed as a portion of a cylinder (i.e., an arc, not shown), positioned with the flanged ends of the corrugations placed in contact with a confronting boundary surface and a closure surface (not shown), either external or incorporated into the structure of the grommet frame or sealing member, extending across the chord of the arc.

Many of the principles, features and advantages of the invention can also be incorporated in to a grommet of circular configuration (not shown), in which a sealing element is mounted within a circular frame and has a corrugated portion formed with primary corrugations propagating in a circle about a center of the grommet and projecting radially inwardly from the circular frame, where the primary corrugations have a progressively diminishing wave length from outside to inside of the grommet. Secondary or cross corrugations, if utilized, would propagate radially with respect to the radially disposed corrugations.

As discussed above, sealing grommets are commonly used in service openings in horizontal floor panels. Therefore, in the foregoing description, some features of the grommet have been defined with respect to horizontal and vertical directions, or upward and downward directions, or the like. However, it will be understood that such definitions are merely for convenience as the grommet can be used and installed in other orientations, such as in a service opening in a vertical wall panel, upside down in a ceiling panel, or in some other orientation. Therefore the definitions of the features of the grommet with respect to horizontal/vertical or upward/downwards or the like are not absolute orientations, but merely relative to the other features of the grommet.

It should thus be understood that the specific forms of the invention herein illustrated and described are representative but not limiting of the invention, and reference should be made to the following appended claims in determining the full and fair scope of the invention.

What is claimed is:

1. A kit for a sealing grommet, the kit comprising:
(a) first and second grommet parts;
(b) each grommet part having a frame and having a sealing member connected to the frame, the sealing member forming an air barrier and having a resiliently flexible web-like corrugated portion formed of elastomeric material;
(c) the corrugated portion having a set of corrugations, having a base portion, and having a corrugated free end edge portion opposite the base portion;
(d) the corrugated free end edge portion being resiliently displaceable toward the base portion; and
(e) the first and second grommet parts being adapted to be positioned with the corrugated free end edge portions of the respective corrugated portions thereof in a closely abutting relationship along a sealing line and with the free end edges of the set of corrugations of the first and second grommet parts being aligned in phase such that, in the absence of displacement of the corrugated free end edge portions by a pass-through object, the corrugated free end edge portion of the first sealing member follows and closely abuts the corrugated free end edge portion of the second sealing member along a full length of the sealing line.

2. A kit for a sealing grommet as in claim 1, wherein
(a) each sealing element is formed with an integrally molded back flange extending along and integrally joined with the base portion of the corrugated portion thereof;
(b) the corrugations of the corrugated portion extend from the free end edge portions thereof to the back flange; and
(c) the frame of each grommet part includes a back portion, and the back flange of the sealing element is connected to the back portion.

3. A kit for a sealing grommet as in claim 2, wherein
(a) each sealing member is formed with integral side flanges at opposite sides thereof, the side flanges being joined integrally with opposite ends of the back flange and with opposite sides of the sealing member;
(b) the frame of each grommet part includes spaced apart side portions; and
(c) the side and back flanges of the sealing member are secured to and supported by the respective side and back portions of the frame.

4. A kit for a sealing grommet as in claim 2, wherein
(a) the back flange is co-mold bonded to the back portion of the frame.

5. A kit for a sealing grommet as in claim 3, wherein
(a) the back and side flanges are co-mold bonded to the back and side portions of the frame, respectively.

6. A kit for a sealing grommet as in claim 1, wherein
(a) the web-like material of the corrugated portion of each sealing member is of tapered thickness becoming thinner in a direction from the base portion to the corrugated free end edge portion thereof.

7. A kit for a sealing grommet as in claim 1, wherein
(a) the elastomeric material is a thermoplastic elastomer.

8. A kit for a sealing grommet as in claim 1, wherein
(a) the corrugations have wave lengths and amplitudes; and
(b) the amplitudes are equal to or greater than the wave lengths.

9. A kit for a sealing grommet as in claim 8, wherein
(a) a ratio of the amplitude to the wave length is in a range of from about 1:1 to about 2:1.

10. A kit for a sealing grommet as in claim 8, wherein
(a) each corrugated portion has a width along a propagation axis and an arc length; and
(b) a ratio of the arc length to the width is in a range of from about 2:1 to about 6:1.

11. A kit for a sealing grommet as in claim 10, wherein
(a) the frame of each grommet part has a back portion and two spaced-apart side portions; and
(b) the corrugated portion of the sealing member extends substantially from one side portion to the other side portion and from the corrugated free end edge portion substantially to the back portion of the frame.

12. A kit for a sealing grommet as in claim 1, wherein:
(a) the corrugations of the set thereof comprise primary corrugations;
(b) the corrugated portion has a set of cross corrugations propagating orthogonal to a propagation axis of the primary corrugations; and
(c) the cross corrugations oscillate normal to a surface of the primary set of corrugations.

13. A kit for a sealing grommet as in claim 12, wherein
(a) the cross corrugations have amplitudes substantially smaller than amplitudes of the primary corrugations.

14. A kit for a sealing grommet as in claim 13, wherein
(a) the set of cross corrugations includes first and second cross corrugations formed on the primary corrugations; and
(b) the cross corrugations are of diminishing amplitude in a direction from the corrugated free end edge portion to the base portion of the corrugated portion.

15. A kit for a sealing grommet as in claim 14, wherein
(a) the primary corrugations have amplitudes of about 1.5 inches;
(b) the first cross corrugation has an amplitude of about 0.050 inch; and
(c) the second cross corrugation has an amplitude of about 0.025 inch.

16. A kit for a sealing grommet as in claim 15, wherein
(a) the cross corrugations have wave lengths of about 0.067 inch;

(b) the first cross corrugation is positioned adjacent the corrugated free end edge portion of the corrugated portion; and (c) the second cross corrugation is positioned between the first cross corrugation and the base portion of corrugated portion.

17. A kit for a sealing grommet as in claim 12, wherein (a) the cross corrugations have wave lengths substantially greater than amplitudes thereof.

18. A kit for a sealing grommet as in claim 17, wherein (a) a ratio of amplitude to wave length of the cross corrugations is in a range of from about 1:13.5 to about 1:27.

19. A kit for a sealing grommet as in claim 12, wherein (a) the cross corrugations extend from adjacent the corrugated free end edge portion of the corrugated portion for approximately one half of a depth dimension of the corrugated portion as measured from the corrugated free end edge portion to the base portion thereof.

20. A kit for a sealing grommet as in claim 1 wherein (a) the corrugated free end edge portion of the corrugated portion has an end flange portion; and (b) the end flange portion follows a path of the set of corrugations and is disposed at an angle relative to a direction from the corrugated free end edge portion to the base portion of the corrugated portion.

21. A kit for a sealing grommet as in claim 20, wherein (a) the end flange portion comprises an arcuately turned end extremity of the sealing member.

22. A kit for a sealing grommet as in claim 20, wherein (a) the first and second grommet parts are adapted to be positioned with the corrugated free end edge portions of the respective corrugated portions thereof in a contacting relationship, with the set of corrugations of the first and second grommet parts aligned in phase, and with the corrugated portions thereof in compression against each other.

23. A kit for a sealing grommet as in claim 22, wherein (a) each corrugated portion has a depth dimension of about three inches as measured from the corrugated free end edge portion to the base portion thereof; and (b) the first and second grommet parts are adapted to be positioned with the corrugated free end edge portions of the corrugated portions thereof in a closely abutting relationship, with the set of corrugations of the first and second grommet parts aligned in phase, with the corrugated portions thereof in compression against each other, and with the base portions thereof spaced apart about 0.020 inches less than twice the depth dimension of the corrugated portions of about three inches.

24. A kit for a sealing grommet as in claim 23, wherein (a) each frame is of U-shaped configuration and is comprised of a back portion and two spaced apart side portions;

(b) each side portion has an end face, and the two end faces define an end plane between them;

(c) the frames of the first and second grommet parts are adapted to be joined at the end faces; and (d) the sealing member of each grommet part extends approximately 0.010 inch beyond the end plane when not joined with another grommet part, and each sealing member is compressed to the end plane when the frames are joined.

25. A kit for a sealing grommet as in claim 1, wherein (a) the first and second grommet parts are adapted to be positioned with the corrugated free end edge portions of the corrugated portions thereof in a contacting relationship, with the set of corrugations of the first and second grommet parts aligned in phase, and with the corrugated free end edge portions thereof in compression against each other along the sealing line.

26. A kit for a sealing grommet as in claim 25, wherein (a) each corrugated portion has a depth dimension of about three inches as measured from the corrugated free end edge portion to the base portion thereof; and (b) the first and second grommet parts are adapted to be positioned with the corrugated free end edge portions of the corrugated portions thereof in a contacting relationship, with the set of corrugations of the first and second grommet parts aligned in phase, with the corrugated portions thereof in compression against each other, and with the base portions thereof spaced apart about 0.020 inches less than twice the depth dimension of the corrugated portions of about three inches.

27. A kit for a sealing grommet as in claim 1, wherein (a) each frame of the first and second grommet parts is of a U-shaped configuration having spaced apart side portions and a back portion; and (b) the side portions of the frames have mutually interconnecting elements for securing the frames together to form a frame assembly of closed configuration.

28. A kit for a sealing grommet as in claim 27, wherein (a) the mutually interconnecting elements comprise mutually engageable tongue and groove elements at outer ends of the side portions of the frame; and (b) the tongue and groove elements of each frame are oriented perpendicular to a plane defined by the U-shape of the frame, whereby two frames may be interconnected to form a frame assembly by movement of one of the frames with respect to the other in a direction perpendicular to each plane.

29. A kit for a sealing grommet as in claim 28, wherein (a) the frame of one of the first and second grommet parts is formed with a tongue element at the end of each of its side portions and the frame of the other of the first and second grommet parts is formed with a groove element at the end of each of its side portions.

30. A kit for a sealing grommet, the kit comprising:

(a) first and second grommet parts;

(b) each grommet part having a frame and having a sealing member connected to the frame, the sealing member forming an air barrier and having a corrugated portion;

(c) the corrugated portion having a set of corrugations, having a base portion, and having a corrugated free end edge portion opposite the base portion;

(d) the corrugated free end edge portion being resiliently deformable toward the base portion; and (e) the first and second grommet parts being adapted to be positioned with the corrugated free end edge portions of the corrugated portions thereof in a closely abutting relationship and with the set of corrugations of the first and second grommet parts being aligned in phase, (f)fn each sealing member being formed of an electrostatically dissipative elastomeric material;

(g) each frame having an inner portion connected to the sealing member and an outer portion adapted to engage with an electrically conductive grommet-supporting surface;

(h) fill a contact portion formed of electrostatically dissipative elastomeric material is being positioned on the outer portion of the frame; and (i) LI an interconnecting portion of electrostatically dissipative elastomeric material integrally joining the sealing member with the contact portion and forming a continuous electrical path from the sealing member to the contact portion.

31. A kit for a sealing grommet as in claim 30, wherein
(a) the sealing member, the contact portion and the interconnecting portion are of unitary, molded construction; and
(b) the frame defines a flow path to accommodate a flow of elastomeric material from the sealing member to the contact portion.

32. A kit for a sealing grommet as in claim 31, wherein
(a) the frame has an outwardly extending flange on the outer portion thereof;
(b) the contact portion is positioned on an underside of the outwardly extending flange and projects below a bottom portion of the outwardly extending flange whereby, when the outwardly extending flange is secured to the grommet-supporting surface, the contact portion is placed under compression.

33. A kit for a sealing grommet as in claim 32, wherein
(a) the outwardly extending flange has a fastener opening therein for the reception of a fastener for securing the flange to the grommet-supporting surface;
(b) the flow path leads to the fastener opening; and
(c) the flow path includes a portion at least partially surrounding the fastener opening, for forming the contact portion.

34. A sealing grommet, comprising:
(a) a frame having opposite sides and defining an opening;
(b) first and second sealing members connected to the frame, each sealing member having a resiliently flexible web-like corrugated portion formed of elastomeric material;
(c) each corrugated portion having a set of corrugations having a base portion, and having a corrugated free end edge portion opposite the base portion;
(d) the corrugated free end edge portion of each sealing member being resiliently displaceable toward the associated base portion; and
(e) the first and second sealing members being positioned with the corrugated free end edge portions thereof in a closely abutting relationship along a sealing line and with the free end edges of the set of corrugations of the first and second sealing members being aligned in phase such that, in the absence of displacement of the corrugated portions by a pass-through object, the corrugated free edge portion of the first sealing member follows and closely abuts the corrugated free end edge portion of the second sealing member along a full length of the sealing line.

35. A sealing grommet as in claim 34, wherein
(a) each sealing element is formed with a back flange extending along and integrally joined with the base portion of the corrugated portion thereof;
(b) the corrugations of the corrugated portion extend from the free end edge portions thereof to the back flange; and
(c) the frame includes first and second back portions, and the back flanges of the first and second sealing elements are connected to the first and second back portions, respectively.

36. A sealing grommet as in claim 35, wherein
(a) each sealing member is formed with integral side flanges at opposite sides thereof, the side flanges being joined integrally with opposite ends of the back flange and with opposite sides of the sealing member;
(b) the frame includes spaced apart side portions; and
(c) the side flanges of the sealing members are secured to and supported by the side portions of the frame.

37. A sealing grommet as in claim 35, wherein
(a) the back flanges are co-mold bonded to the back portions of the frame.

38. A sealing grommet as in claim 36, wherein
(a) the back and side flanges are co-mold bonded to the back and side portions of the frame, respectively.

39. A sealing grommet as in claim 34, wherein
(a) the web-like material of the corrugated portion of each sealing member is of tapered thickness becoming thinner in a direction from the base portion to the corrugated free end edge portion thereof.

40. A sealing grommet as in claim 34, wherein
(a) the elastomeric material is a thermoplastic elastomer.

41. A sealing grommet as in claim 34, wherein
(a) the corrugations have wave lengths and amplitudes; and
(b) the amplitudes are equal to or greater than the wave lengths.

42. A sealing grommet as in claim 41, wherein
(a) a ratio of the amplitude to the wave length is in a range of from about 1:1 to about 2:1.

43. A sealing grommet as in claim 41, wherein
(a) each corrugated portion has a width along a propagation axis and an arc length; and
(b) a ratio of the arc length to the width is in a range of from about 2:1 to about 6:1.

44. A sealing grommet as in claim 43, wherein
(a) the frame has two back portions and two spaced-apart side portions; and
(b) the corrugated portion of each sealing member extends substantially from one side portion to the other side portion and from the corrugated free end edge portion thereof substantially to an associated back portion of the frame.

45. A sealing grommet as in claim 34, further comprising:
(a) the corrugations of the set thereof comprise primary corrugations;
(b) the corrugated portion of each sealing member having a set of cross corrugations propagating orthogonal to a propagation axis of the primary corrugations;
(c) the cross corrugations oscillating normal to a surface of the primary set of corrugations.

46. A sealing grommet as in claim 45, wherein
(a) the cross corrugations have amplitudes substantially smaller than amplitudes of the primary corrugations.

47. A sealing grommet as in claim 46, wherein
(a) the set of cross corrugations includes first and second cross corrugations formed on the primary corrugations; and
(b) the cross corrugations are of diminishing amplitude in a direction from the corrugated free end edge portion to the base portion of the corrugated portion.

48. A sealing grommet as in claim 47, wherein
(a) the primary corrugations have amplitudes of about 1.5 inches;
(b) the first cross corrugation has an amplitude of about 0.050 inch; and
(c) the second cross corrugation has an amplitude of about 0.025 inch.

49. A sealing grommet as in claim 48, wherein
(a) the cross corrugations have wave lengths of about 0.067 inch;
(b) the first cross corrugation is positioned adjacent the corrugated free edge portion of the corrugated portion; and (c) the second cross corrugation is positioned between the first cross corrugation and the base portion of corrugated portion.

50. A sealing grommet as in claim 45, wherein
(a) the cross corrugations have wave lengths substantially greater than amplitudes thereof.

51. A sealing grommet as in claim 50, wherein
(a) a ratio of amplitude to wave length of the cross corrugations is in a range of from about 1:13.5 to about 1:27.

52. A sealing grommet as in claim 45, wherein
(a) the cross corrugations extend from adjacent the corrugated free end edge portion of the corrugated portion for approximately one half of a depth dimension of the corrugated portion as measured from the corrugated free end edge portion to the base portion thereof.

53. A sealing grommet as in claim 34 wherein
(a) the corrugated free end edge portion of the corrugated portion has an end flange portion; and
(b) the end flange portion follows a path of the set of corrugations and is disposed at an angle relative to a direction from the corrugated free end edge portion to the base portion of the corrugated portion.

54. A sealing grommet as in claim 53, wherein
(a) the end flange portion comprises an arcuately turned end extremity of the sealing member.

55. A sealing grommet as in claim 53, wherein
(a) the corrugated portions of the first and second sealing members are in compression against each other.

56. A sealing grommet as in claim 55, wherein
(a) each corrugated portion has an uncompressed depth dimension of about three inches as measured from the corrugated free end portion to the base portion thereof; and
(b) the base portions thereof are spaced apart about 0.020 inches less than twice the uncompressed depth dimension of the corrugated portions of about three inches.

57. A sealing grommet as in claim 34, wherein
(a) the free end edges of the corrugated portions of the first and second sealing members are in compression against each other along the sealing line.

58. A sealing grommet as in claim 57, wherein
(a) each corrugated portion has an uncompressed depth dimension of about three inches as measured from the corrugated free end edge portion to the base portion thereof; and
(b) the base portions thereof are spaced apart about 0.020 inches less than twice the uncompressed depth dimension of the corrugated portions of about three inches.

59. A sealing grommet as in claim 34, wherein
the frame has two back portions and two spaced-apart side portions;
the corrugated free end edge portion of each sealing member spans substantially from one side portion of the frame to the other side portion, and the corrugated portion of each sealing member extends from an associated back portion of the frame to the corrugated free end edge portion thereof; and
the sealing line between each corrugated free end edge portion of the sealing members spans substantially from one side portion of the frame to the other side portion.

60. A sealing grommet as in claim 59, wherein
the corrugations of each corrugated portion each have a propagation axis, and each propagation axis is parallel to the sealing line.

61. A sealing grommet, comprising:
(a) a frame;
(b) first and second sealing members connected to the frame, each sealing member forming an air barrier and having a corrugated portion;
(c) each corrugated portion having a set of corrugations, having a base portion, and having a corrugated free end portion opposite the base portion;
(d) the corrugated free end portion of each sealing member being resiliently deformable toward the associated base portion;
(e) the first and second sealing members being positioned with the corrugated free end portions thereof in a closely abutting relationship and with the set of corrugations of the first and second sealing members being aligned in phase,
(f) each sealing member being formed of an electrostatically dissipative elastomeric material;
(g) the frame having an inner portion connected to at least one sealing member and an outer portion adapted to engage with an electrically conductive grommet-supporting surface;
(h) a contact portion formed of electrostatically dissipative elastomeric material being positioned on the outer portion of the frame; and
(i) an interconnecting portion of electrostatically dissipative elastomeric material integrally joining the sealing member with the contact portion and providing a continuous electrical path from the one sealing member to the contact portion.

62. A sealing grommet as in claim 61, wherein
(a) the one sealing member, the contact portion and the interconnecting portion are of unitary, molded construction; and
(b) the frame defines a flow path to accommodate a flow of elastomeric material from the one sealing member to the contact portion.

63. A sealing grommet as in claim 62, wherein
(a) the frame has an outwardly extending flange on the outer portion thereof;
(b) the contact portion is positioned on an underside of the outwardly extending flange and projects below a bottom portion of the outwardly extending flange whereby, when the outwardly extending flange is secured to the grommet-supporting surface, the contact portion is placed under compression.

64. A sealing grommet as in claim 63, wherein
(a) the outwardly extending flange has a fastener opening therein for the reception of a fastener for securing the flange to the grommet-supporting surface;
(b) the flow path leads to the fastener opening; and
(c) the flow path includes a portion at least partially surrounding the fastener opening, for forming the contact portion.

* * * * *

UNITED STATES PATENT AND TRADEMARK OFFICE
CERTIFICATE OF CORRECTION

PATENT NO. : 8,507,798 B2
APPLICATION NO. : 12/705280
DATED : August 13, 2013
INVENTOR(S) : Arthur T. Sempliner et al.

Page 1 of 1

It is certified that error appears in the above-identified patent and that said Letters Patent is hereby corrected as shown below:

In the Claims

Column 14, Claim 16:
In line 66, "0.067" should be changed to --0.67--;

Column 18, Claims 49:
In line 63, "0.067" should be changed to --0.67--.

Signed and Sealed this
First Day of April, 2014

Michelle K. Lee
*Deputy Director of the United States Patent and Trademark Office*